United States Patent
Nagaishi et al.

(10) Patent No.: US 7,612,917 B2
(45) Date of Patent: Nov. 3, 2009

(54) PRINTING METHOD, DEVICE, AND PROGRAM, COMPUTER-READABLE RECORDING MEDIUM, PRINTING DEVICE CONTROL PROGRAM AND METHOD, AND PRINTING DATA GENERATION DEVICE, PROGRAM, AND METHOD

(75) Inventors: Michihiro Nagaishi, Okaya (JP); Shinichi Arazaki, Shimosuwa (JP)

(73) Assignee: Seiko Epson Corporation (JP)

( * ) Notice: Subject to any disclaimer, the term of this patent is extended or adjusted under 35 U.S.C. 154(b) by 458 days.

(21) Appl. No.: 11/375,669

(22) Filed: Mar. 14, 2006

(65) Prior Publication Data

US 2006/0209347 A1 Sep. 21, 2006

(30) Foreign Application Priority Data

Mar. 16, 2005 (JP) ............................. 2005-074470
Dec. 26, 2005 (JP) ............................. 2005-372135

(51) Int. Cl.
*H04N 1/405* (2006.01)
*B41J 2/205* (2006.01)
(52) U.S. Cl. ................... 358/3.12; 347/15; 358/3.02; 358/3.09; 358/3.1
(58) Field of Classification Search ............... 347/15, 347/19, 43, 41; 358/1.2, 1.9, 3.23, 3.12, 358/3.02, 3.09, 3.1
See application file for complete search history.

(56) References Cited

U.S. PATENT DOCUMENTS

| | | | | |
|---|---|---|---|---|
| 5,255,085 A | * | 10/1993 | Spence | ...................... 358/527 |
| 5,430,469 A | * | 7/1995 | Shioya et al. | .................. 347/15 |
| 5,777,640 A | * | 7/1998 | Shioya et al. | .................. 347/15 |
| 5,844,582 A | * | 12/1998 | Shioya | ........................ 347/15 |
| 6,260,939 B1 | * | 7/2001 | Shioya et al. | .................. 347/15 |
| 6,283,571 B1 | | 9/2001 | Zhou et al. | |
| 6,293,643 B1 | | 9/2001 | Shimada et al. | |
| 6,328,404 B1 | | 12/2001 | Fujimori | |
| 6,406,114 B1 | * | 6/2002 | Shioya | ........................ 347/15 |
| 7,023,580 B2 | * | 4/2006 | Zhang et al. | ................. 358/1.9 |
| 7,031,025 B1 | * | 4/2006 | He et al. | .................... 358/3.09 |
| 7,290,846 B2 | * | 11/2007 | Takahashi | ..................... 347/15 |
| 7,367,644 B2 | * | 5/2008 | Arazaki et al. | ................. 347/15 |

FOREIGN PATENT DOCUMENTS

| | | |
|---|---|---|
| JP | 01-235655 | 9/1989 |
| JP | 06-191040 | 7/1994 |
| JP | 11-151821 | 8/1999 |
| JP | 11-254662 | 9/1999 |
| JP | 2000-79710 | 3/2000 |
| JP | 2000-190470 | 7/2000 |
| JP | 2000-225716 | 8/2000 |
| JP | 2002-361909 | 12/2002 |

* cited by examiner

*Primary Examiner*—Stephen D Meier
*Assistant Examiner*—Rene Garcia, Jr.
(74) *Attorney, Agent, or Firm*—Harness, Dickey & Pierce, P.L.C.

(57) ABSTRACT

A printing method includes the step of printing an image of a plurality of pixels by discharging a plurality of size-varying ink droplets each representing a tone of the corresponding pixel.

12 Claims, 13 Drawing Sheets

| PIXEL P | TONE 1 | TONE 2 | TONE 3 | TONE 4 | TONE 5 | TONE 61 | TONE 62 | TONE 63 | TONE 64 |
|---|---|---|---|---|---|---|---|---|---|
| DOT D | ○ SIZE 1 | ○ SIZE 2 | ○ SIZE 3 | ○ SIZE 4 | ○ SIZE 5 | ◯ SIZE 61 | ◯ SIZE 62 | ◯ SIZE 63 | ◯ SIZE 64 |

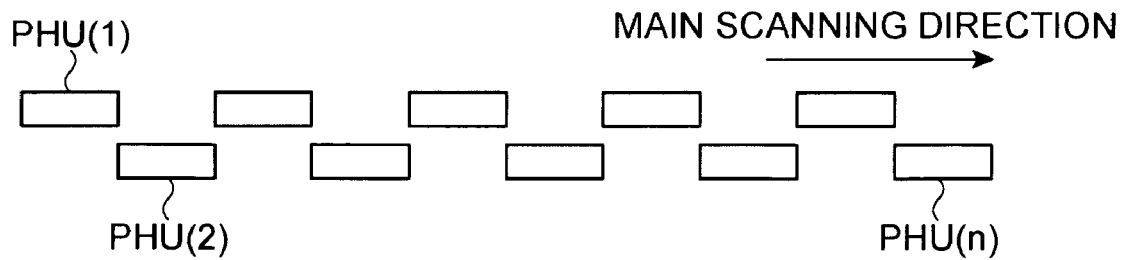
FIG.3
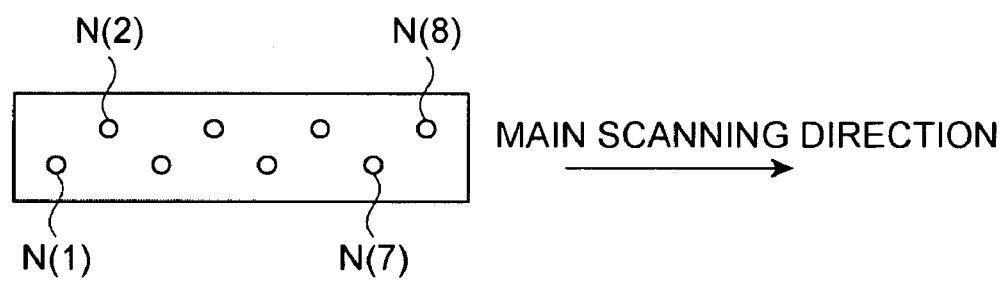
FIG.4
| PIXEL P | TONE 1 | TONE 2 | TONE 3 | TONE 4 | TONE 5 | TONE 61 | TONE 62 | TONE 63 | TONE 64 |
|---|---|---|---|---|---|---|---|---|---|
| DOT D | ∘ SIZE 1 | ∘ SIZE 2 | ○ SIZE 3 | ○ SIZE 4 | ○ SIZE 5 | ◯ SIZE 61 | ◯ SIZE 62 | ◯ SIZE 63 | ◯ SIZE 64 |
FIG.5

| PIXEL | P(1,1) | P(1,2) | P(1,3) | P(1,4) | P(1,5) | P(1,6) | P(1,7) | P(1,8) | P(1,9) |
|---|---|---|---|---|---|---|---|---|---|
| TONE | 3 | 52 | 41 | 60 | 18 | 37 | 26 | 9 | 45 |

FIG. 9

| PIXEL P | TONE 1 | TONE 2 | TONE 3 | TONE 4 | TONE 5 | TONE 61 | TONE 62 | TONE 63 | TONE 64 |
|---|---|---|---|---|---|---|---|---|---|
| DOT D | ⊗ SIZE 1 | ⊗ SIZE 2 | ⊗ SIZE 3 | ○ SIZE 4 | ○ SIZE 5 | ○ SIZE 61 | ○ SIZE 62 | ○ SIZE 63 | ○ SIZE 64 |

FIG. 10

S-SHAPE CORRECTION

INVERTED-S-SHAPE CORRECTION

PRINTING METHOD, DEVICE, AND PROGRAM, COMPUTER-READABLE RECORDING MEDIUM, PRINTING DEVICE CONTROL PROGRAM AND METHOD, AND PRINTING DATA GENERATION DEVICE, PROGRAM, AND METHOD

RELATED APPLICATIONS

This application claims priority to Japanese Patent Application Nos. 2005-074470 filed Mar. 16, 2005 and 2005-372135 filed Dec. 26, 2005 which are hereby expressly incorporated by reference herein in their entirety.

BACKGROUND

1. Technical Field

The present invention relates to a printing method for use for image printing by ink droplet discharge as printing by inkjet printers, a printing device using the printing method, a printing program for exercising control over a printing operation of the printing device, and a computer-readable recording medium recorded with the printing program. The invention also relates to a printing device, program, and method, a printing data generation device, program, and method, all of which are suitable for a so-called inkjet printing process of discharging liquid ink particles of a plurality of colors on a printing medium, or a so-called sublimation printing process of ink sublimation through heat application using a printing head to an ink ribbon coated with a solid ink for attachment to a printing medium.

2. Related Art

In a previous-type printing method, for pseudo representation of M tones ($M \geq 3$), e.g., M=64 (tones) using two tones (binary) of whether or not to discharge the ink droplets, the ink droplets are changed in amount for dot size change for printing to a printing medium, or a dot is formed by a plurality of ink droplets. In the following, such a printing method with a pseudo M-tone is referred to as "pseudo multi-tone printing method".

In Patent Document 1 of a previous printing method associated with the pseudo multi-tone printing method (JP-A-2002-361909), for the aim of achieving even consistency between any two dots discharged on a printing medium, i.e., for making the granularity better, a smaller ink droplet, i.e., smaller dot, is discharged between the two dots for compliment use. In this method, a plurality of nozzles are disposed in several lines along a sub-scanning direction, and these nozzles discharge ink droplets for printing. In this configuration, the nozzles may be displaced in a main scanning direction, and the dot-to-dot distance may thus become uneven, i.e., a banding problem occurs. For taking measures against such a banding problem, the ink droplets are increased in amount to make the dots larger, which are originally formed with a relatively wide dot-to-dot distance so that the uneven space becomes seemingly even.

In Patent Document 2 of another previous printing method associated with the pseudo multi-tone printing method (JP-A-6-191040), when a printing image is of a photo, the image is printed with smaller dots for the aim of reproducing the photo with high resolution. When a printing image is of letters and characters, the image is printed with larger dots for the aim of reproducing the letters and characters clearly, i.e., with clarity and high contrast.

The problem with such previous pseudo multi-tone printing methods of changing the dot size for pseudo representation of M tones ($M \geq 3$) is that it takes quite a long time due to the complexity of image processing. This thus results in the difficulty of changing the dot size in practical use.

SUMMARY

An advantage of some aspects of the invention is to provide a printing method, device, program, a computer-readable recording medium, printing device control program and method, and a printing data generation device, program, and method, all of which enable printing of multi-tone (M tones ($M \geq 3$)) images without making image processing complicated.

First Aspect

A first aspect of the invention is directed to a printing method that includes: the step of printing an image of a plurality of pixels by discharging a plurality of size-varying ink droplets each corresponding to each of M tones ($M \geq 3$) represented by each of the pixels.

With the printing method of the first aspect, in the printing step, an image of a plurality of pixels is printed by discharging a plurality of size-varying ink droplets each representing a tone. This enables to reproduce an image of M tones ($M \geq 3$) without requiring so much time for complex image processing tasks.

Second Aspect

According to a printing method of a second aspect, in the first aspect, the step of correcting is further included to correct any of the tones in accordance with a tone curve that serves as a criterion for a tone correction, and defines a tone relationship in terms of before and after the tone correction. In the printing step, the image is printed with the tone corrected in the correcting step using any of the droplets of a size corresponding to the corrected tone.

Third Aspect

According to a printing method of a third aspect, in the second aspect, the step of defining is further included to define an upper or lower limit in the tone curve for the corrected tone, or define a distance between any adjacent pixels after the tone correction in accordance with a possible printing problem to be caused by printing of the image, details of the printing, or surroundings of a printing device.

Fourth Aspect

A fourth aspect of the invention is directed to, for the aim of solving the above-described previous problems, a printing device, including a printing section that prints an image of a plurality of pixels by discharging a plurality of size-varying ink droplets each corresponding to each of M tones ($M \geq 3$) represented by each of the pixels.

Fifth Aspect

According to a printing device of a fifth aspect, in the fourth aspect, a correction section is further included to correct any of the tones in accordance with a tone curve that serves as a criterion for a tone correction, and defines a tone relationship in terms of before and after the tone correction. The printing section prints the image with the tone corrected in the correction section using any of the droplets of a size corresponding to the corrected tone.

Sixth Aspect

According to a printing device of a sixth aspect, in the fifth aspect, a definition section is further included to define an upper or lower limit in the tone curve for the corrected tone, or a distance between any adjacent pixels after the tone correction in accordance with a possible printing problem to be caused by printing of the image, details of the printing, or surroundings of the printing device.

Seventh Aspect

A seventh aspect of the invention is directed to, for the aim of solving the above-described previous problems, a printing program that includes the step of: printing by making a printing section print an image of a plurality of pixels by discharging a plurality of size-varying ink droplets each corresponding to each of M tones (M≧3) represented by each of the pixels.

Eighth Aspect

According to a printing program of an eighth aspect, in the seventh aspect, the step of correcting is further included to make a correction section correct any of the tones in accordance with a tone curve that serves as a criterion for a tone correction, and defines a tone relationship in terms of before and after the tone correction. In the printing step, the printing section is made to print the image with the tone corrected in the correcting step using any of the droplets of a size corresponding to the corrected tone.

Ninth Aspect

According to a printing program of a ninth aspect, in the eighth aspect, the step of defining is further included to define an upper or lower limit in the tone curve for the corrected tone, or a distance between any adjacent pixels after the tone correction in accordance with a possible printing problem to be caused by printing of the image, details of the printing, or surroundings of a printing device.

Tenth Aspect

A tenth aspect of the invention is directed to a computer-readable recording medium recorded with the printing program of any one of the seventh to ninth aspects.

Eleventh Aspect

An eleventh aspect of the invention is directed to, for the aim of solving the above-described previous problems, a printing device that includes: a printing head including a printed element that is capable of forming a plurality types of dots each corresponding to each of M tones (M≧3) represented by each pixel of an image; an image data acquisition unit that acquires image data of pixel values each representing each of the tones of the pixels of the image; a dot type selection unit that selects from the type-varying dots, for each of the pixel values of the acquired image data, a dot type corresponding to each of the tones represented by the pixel values; a printing data generation unit that generates, based on the selection result derived for each of the pixel values, printing data in which each of the pixel values is defined by the dot type; and a printing unit that prints, based on the printing data, the image of the image data using the printing head.

Such a configuration enables the image data acquisition unit to acquire image data of pixel values each representing each of the tones of the pixels of an image, and the dot type selection unit to select from the type-varying dots, for each of the pixel values of the acquired image data, a dot type corresponding to each of the tones represented by the pixel values. The configuration also enables the printing data generation unit to generate, based on the selection result derived for each of the pixel values, printing data in which each of the pixel values is defined by the dot type, and the printing unit to print, based on the printing data, the image of the image data using the printing head.

This thus enables to generate printing data defining each of the pixel values by dot type. For such definition, used is the selection result derived only by selecting a dot type for each of the pixel values of the image data from a plurality types of dots each corresponding to each of the M tones (M≧3). The resulting printing data enables to print images of the image data so that any multi-tone images (M tones (M≧3)) can be printed without requiring so much time for complex image processing tasks.

The dot type here includes a type of dots being of the same printing densities but of different sizes, a type of dots being of the same sizes but of different printing densities, a type of dots being of different printing densities and different sizes, and others. Note here that "no dot (forming no dot)" may be included as a dot type. In the following, this is applicable to aspects of "printing device control program", "printing device control method", "printing data generation device", "printing data generation program", and "printing data generation method", descriptions in the "description of exemplary embodiments", and others.

If not with "no dot", the "dot" is not zero in area, is of a predetermined size (area), and is of various sizes and printing densities. The formed dot is not necessarily be a perfect circle in shape, and may take any other shape such as an ellipse. If the resulting dots are not perfect circle but ellipse, for example, their dot diameter may be their average value. Alternatively, an equivalent dot is estimated for a perfect circle having the same area as a dot formed by a certain amount of ink, and the diameter of the estimated equivalent dot may be dealt as the dot diameter. To form dots varying in density, various techniques are applicable, e.g., forming dots of the same sizes but of different densities, forming dots of the same densities but of different sizes, forming dots of different densities by changing the discharge amount and frequency of ink of the same densities, or others. If an ink droplet discharged from one specific nozzle is broken up before reaching the printing medium, the resulting dots are dealt as one dot. If two or more dots are merged together after being discharged from any two nozzles or from one specific nozzle after a time lag, the resulting dots are dealt as two dots. In the following, this is applicable to aspects of "printing device control program", "printing device control method", "printing data generation device", "printing data generation program", and "printing data generation method", descriptions in the "description of exemplary embodiments", and others.

The "image data acquisition unit" acquires image data that is provided from a unit for reading optical printing results exemplified by a scanner unit or others, a digital camera, a VCR camera, or others. Such image acquisition is made also from any external device over a network such as LAN or WAN passively or actively, or from recording media such as CD-ROMs or DVD-ROMs via drives of its own printing device, e.g., CD drives or DVD drives, or from a storage device of its own printing device, for example. That is, the image acquisition at least includes data input, acquisition, reception, and reading. In the following, this is applicable to aspects of "printing device control program", "printing device control method", "printing data generation device", "printing data generation program", and "printing data generation method", descriptions in the "description of exemplary embodiments", and others.

The expression of "each of the pixel values is defined by the dot type" means to configure "information about the dot type assigned to each of the pixel values" using the "printing device"-interpretable "data format". In the following, this is applicable to aspects of "printing device control program", "printing device control method", "printing data generation device", "printing data generation program", and "printing data generation method", descriptions in the "description of exemplary embodiments", and others.

Twelfth Aspect

According to a printing device of a twelfth aspect, in the eleventh aspect, the type-varying dots are of different sizes corresponding to each of the M tones.

Such a configuration enables the printing head to represent each of the M tones in various ink colors with dots of various sizes (various ink amounts of droplet). For generation of printing data, the dot type selection unit is only required to select a dot type for the size (ink amount of droplet) corresponding to each of the pixel values of the image data. The resulting printing data derived from the selection result defines each of the pixel values by dot type, and enables to print images of the image data so that any multi-tone images (M tones (M≧3)) can be printed without requiring so much time for complex image processing tasks.

Thirteenth Aspect

According to a printing device of a thirteenth aspect, in the eleventh aspect, the type-varying dots are of the same sizes but of different printing densities corresponding to each of the M tones.

Such a configuration enables the printing head to represent each of the M tones in various ink colors with various types of dots of the same sizes but of different printing densities. For generation of printing data, the dot type selection unit is only required to select a dot type for the printing density corresponding to each of the pixel values of the image data. The resulting printing data derived from the selection result defines each of the pixel values by dot type, and enables to print images of the image data so that any multi-tone images (M tones (M≧3)) can be printed without requiring so much time for complex image processing tasks.

Fourteenth Aspect

According to a printing device of a fourteenth aspect, in any one of the eleventh to thirteenth aspects, the dot type selection unit selects, for any of the pixel values of a predetermined value, any of the dot types corresponding to any of the tones different from the tone represented by the pixel value.

When the printing head is capable of forming a plurality types of dots for each of 256 tones (M=256), for example, such a configuration enables dot type selection not only corresponding to one specific tone range but to other tone range. For example, for pixel values of tones 72 to 127, the dot types are not selected for the tone range but to a tone range of tones 1 to 65, or for pixel values of tones 72 to 127, the dot types are not selected for the tone range but to a tone range of the tones 129 to 184.

Such dot type selection can change a tone curve showing the relationship between the tone values and the dot types. This serves effective when images of any acquired image data are low in contrast and look blurred. With this being the case, the contrast of the images is improved so that the images can be made visually enhanced. As such, the printing quality can be effectively increased.

Fifteenth Aspect

According to a printing device of a fifteenth aspect, in any one of the eleventh to fourteenth aspects, a characteristics information extraction unit is further included to extract characteristics information from the acquired image data. Based on the extracted characteristics information, the dot type selection unit selects, for any of the pixel values of the acquired image data showing predetermined details of the characteristic information, any of the dot types corresponding to any of the tones different from the tone of the pixel value.

Such a configuration enables the characteristics information extraction unit to extract characteristics information from the image data acquired by the image data acquisition unit. This configuration also enables the dot type selection unit to select, based on the extracted characteristics information, for any of the pixel values of the acquired image data showing predetermined details of the characteristic information, any of the dot types corresponding to any of the tones different from the tone of the pixel value.

By deriving information about images, e.g., image type or image frequency, from characteristics information of an image, the dot type selection can be appropriately made, thereby effectively increasing the printing quality.

Sixteenth Aspect

According to a printing device of a sixteenth aspect, in the fifteenth aspect, an image type determination unit is further included to determine an image type of the acquired image data based on the extracted characteristics information. Based on the determined image type, for any of the dot types corresponding to each of the M tones, the dot type selection unit determines a tone range for use for a selection process.

Such a configuration enables the image type determination unit to determine an image type of the acquired image data based on the extracted characteristics information, and the dot type selection unit to determine a tone range for use for a selection process based on the determined image type for any of the dot types corresponding to each of the M tones.

Accordingly, depending on the image type, the tone range can be changed for the type-varying dots each corresponding to each of the M tones. With an image type of photo image, for example, the tone range is changed to enable printing with relatively-small-sized dots so that the resulting printed image will have relatively better granularity. With an image type of text image, i.e., document image, for example, the tone range is changed to enable printing with relatively-large-sized dots so that the resulting printed image will have relatively low granularity. As such, the tone range is so changed that any image type requiring high resolution is assigned with a dot type of increasing granularity, and any image type achieving low-granularity-but-visually-enough image quality is assigned with a dot type of reducing granularity. This thus effectively eases to change a tone range for use for dot type selection, and increases the image quality.

Seventeenth Aspect

According to a printing device of a seventeenth aspect, in the fifteenth aspects, a print element property information acquisition unit is further included to acquire print element property information representing properties of a print element configuring the printing head. Based on the acquired print element property information, for any of the dot types corresponding to each of the M tones, the dot type selection unit determines a tone range for use for a selection process.

Such a configuration enables the print element property information acquisition unit to acquire print element property information representing properties of a print element configuring the printing head, and the dot type selection unit to determine a tone range for use for a selection process based on the acquired print element property information for any of the dot types corresponding to each of the M tones.

Considered now is a case where a print element configuring an inkjet-type printing head causes an ink clogging problem in winter time, for example, and the ink amount from the print element is thus decreased than usual. With this being the case, the tone range may be so determined as to select relatively larger-sized dots than those indicated by the relationship between the tones and the pixel values. With such tone range change, even if the properties of the print element are changed due to surroundings change, e.g., temperature or humidity change because of seasonal factors, deterioration with time, or others, printing can be performed with any appropriate dot type.

Herein, the "print element property information acquisition unit" is configured by a unit for reading optical printing results exemplified by a scanner unit or others, and is used to check the ink discharge amount or others of the print element using the printing result derived by the printing head. As an alternative configuration, a CCD (charge-coupled device) sensor or others may check the ink discharge problem. Information about the check result, i.e., print element property information, is stored together or overwritten with data at shipment, for example. In the following, this is applicable to aspects of "printing device control program", "printing device control method", "printing data generation device", "printing data generation program", and "printing data generation method", descriptions in the "description of exemplary embodiments", and others.

Eighteenth Aspect

According to an eighteenth aspect, in any one of the fourteenth to seventeenth aspects, when the pixel values are density values, for the pixel value of the predetermined value being smaller than a predetermined pixel value, the dot type selection unit selects any of the dot types corresponding to any of the tones represented by any of the pixel values smaller than the pixel value, and for the pixel value of the predetermined value being larger than the predetermined pixel value, the dot type selection unit selects any of the dot types corresponding to any of the tones represented by any of the pixel values larger than the pixel value.

When the printing head is capable of forming a plurality types of dots for each of 256 tones (M=256), for example, such a configuration enables dot type selection not only corresponding to one specific tone range but to other tone range. For example, for pixel values of tones 72 to 127 (lower than a tone of 128), the dot types are not selected for the tone range but to a tone range of tones 1 to 65, or for pixel values of tones 129 to 184 (higher than the tone of 128), the dot types are not selected for the tone range but to a tone range of the tones 194 to 249.

Accordingly, the tone curve showing the relationship between the tone values and the dot types will take an S-shape. This serves effective when images of any acquired image data are low in contrast and look blurred. With this being the case, the contrast of the images is improved so that the images can be made visually enhanced, and when the dot type is of a dot size type, the granularity can be increased. As such, the printing quality can be effectively increased.

Nineteenth Aspect

According to a printing device of a nineteenth aspect, in any one of the fourteenth to seventeenth aspects, when the pixel values are density values, for the pixel value of the predetermined value being smaller than a predetermined pixel value, the dot type selection unit selects any of the dot types corresponding to any of the tones represented by any of the pixel values larger than the pixel value, and for the pixel value of the predetermined value being larger than the predetermined pixel value, the dot type selection unit selects any of the dot types corresponding to any of the tones represented by any of the pixel values smaller than the pixel value.

When the printing head is capable of forming a plurality types of dots for each of 256 tones (M=256), for example, such a configuration enables dot type selection not only corresponding to one specific tone range but to other tone range. For example, for pixel values of tones 1 to 65 (lower than the tone of 128), the dot types are not selected for the tone range but to a tone range of tones 72 to 127, or for pixel values of tones 194 to 249 (higher than the tone of 128), the dot types are not selected for the tone range but to a tone range of the tones 129 to 184.

Accordingly, the tone curve showing the relationship between the tone values and the dot types will take an inverted-S shape. This serves well to make the images of the acquired image visually enhanced so that the printing quality can be effectively increased.

Twentieth Aspect

According to a printing device of a twentieth aspect, in any one of the fourteenth to seventeenth aspects, the characteristics information includes frequency information, and when the pixel values are density values, for any of the pixel values with a frequency being a predetermined frequency or lower in the characteristics information extracted from the acquired image data, when the pixel value of the predetermined value is smaller than a predetermined pixel value, the dot type selection unit selects any of the dot types corresponding to any of the tones represented by any of the pixel values smaller than the pixel value, and when the pixel value of the predetermined value is larger than the predetermined pixel value, the dot type selection unit selects any of the dot types corresponding to any of the tones represented by any of the pixel values larger than the pixel value.

When the printing head is capable of forming a plurality types of dots for each of 256 tones (M=256) for image data with relatively low-frequency components, for example, such a configuration enables dot type selection not only corresponding to one specific tone range but to other tone range. For example, for pixel values of tones 72 to 127 (lower than the tone of 128), the dot types are not selected for the tone range but to a tone range of tones 1 to 65, or for pixel values of tones 129 to 184 (higher than the tone of 128), the dot types are not selected for the tone range but to a tone range of the tones 194 to 294.

That is, an image including any low-frequency component is highly likely to be a low-contrast image so that it is easily distinguished. Moreover, a dot type selection can be made in such a manner that the tone curve showing the relationship between the tone values and dot types forms an S-shape. The low-contrast image can be thus increased in contrast and made visually enhanced, and when the dot type is of a dot size type, the granularity can be increased. As such, the printing quality can be effectively increased.

Twenty-First Aspect

A twenty-first aspect of the invention is directed to, for the aim of solving the above-described previous problems, a printing device control program for use for controlling a printing device provided with a printing head including a printed element that is capable of forming a plurality types of dots each corresponding to each of M tones (M≧3) represented by each pixel of an image. The printing device control program includes the steps of: acquiring image data of pixel values each representing each of the tones of the pixels of the image; selecting from the type-varying dots, for any of the pixel values of the acquired image data, any of the dot types corresponding to the tone of the pixel value; generating, based on the selection result derived for each of the pixel values, printing data in which each of the pixel values is defined by the dot type; and printing, based on the printing data, the image of the image data using the printing head.

Such a configuration leads to effects and advantages similar to the printing device of the eleventh aspect by a computer reading a program and executing processes in accordance with the program.

Printing devices on the current market such as inkjet printers are each provided with a computer system, which is configured to include a Central Processing Unit (CPU), a storage device (Random Access Memory (RAM), Read Only Memory (ROM)), an input/output device, or others. Using such a computer system, the processes can be implemented by software. The printing device control program thus can implement the processes more economically and with more ease than a case with hardware that is specifically built for the purpose.

Moreover, through partial rewriting of the program, it leads to easy version up by function modification or improvement, for example.

Twenty-Second Aspect

According to a printing device control program of a twenty-second aspect, in the twenty-first aspect, the type-varying dots are of different sizes corresponding to each of the M tones.

Such a configuration leads to effects and advantages similar to the printing device of the twelfth aspect by a computer reading a program and executing processes in accordance with the program.

Twenty-Third Aspect

According to a printing device control program of a twenty-third aspect, in the twenty-first aspect, the type-varying dots are of the same sizes but of different printing densities corresponding to each of the M tones.

Such a configuration leads to effects and advantages similar to the printing device of the thirteenth aspect by a computer reading a program and executing processes in accordance with the program.

Twenty-Fourth Aspect

According to a printing device control program of a twenty-fourth aspect, in any one of the twenty-first to twenty-third aspects, the dot type selecting step selects, for any of the pixel values of a predetermined value, any of the dot types corresponding to any of the tones different from the tone represented by the pixel value.

Such a configuration leads to effects and advantages similar to the printing device of the fourteenth aspect by a computer reading a program and executing processes in accordance with the program.

Twenty-Fifth Aspect

According to a printing device control program of a twenty-fifth aspect, in any one of the twenty-first to twenty-fourth aspects, a program is further included for a computer to go through a characteristics information extraction step of extracting characteristics information from the acquired image data. Based on the extracted characteristics information, the dot type selecting step selects, for any of the pixel values of the acquired image data showing predetermined details of the characteristic information, any of the dot types corresponding to any of the tones different from the tone of the pixel value.

Such a configuration leads to effects and advantages similar to the printing device of the fifteenth aspect by a computer reading a program and executing processes in accordance with the program.

Twenty-Sixth Aspect

According to a printing device control program of a twenty-sixth aspect, in the twenty-fifth aspect, a program is further included for a computer to go through an image type determining step of determining an image type of the acquired image data based on the extracted characteristics information. Based on the determined image type, for any of the dot types corresponding to each of the M tones, the dot type selecting step determines a tone range for use for a selection process.

Such a configuration leads to effects and advantages similar to the printing device of the sixteenth aspect by a computer reading a program and executing processes in accordance with the program.

Twenty-Seventh Aspect

According to a printing device control program of a twenty-seventh aspect, in the twenty-fifth aspect, a program is further included for a computer to go through a print element property information acquiring step that acquires print element property information representing properties of a print element configuring the printing head. Based on the acquired print element property information, for any of the dot types corresponding to each of the M tones, the dot type selecting step determines a tone range for use for a selection process.

Such a configuration leads to effects and advantages similar to the printing device of the seventeenth aspect by a computer reading a program and executing processes in accordance with the program.

Twenty-Eighth Aspect

According to a printing device control program of a twenty-eighth aspect, in any one of the twenty-fourth to twenty-seventh aspects, when the pixel values are density values, for the pixel value of the predetermined value being smaller than a predetermined pixel value, the dot type selecting step selects any of the dot types corresponding to any of the tones represented by any of the pixel values smaller than the pixel value, and for the pixel value of the predetermined value being larger than the predetermined pixel value, the dot type selecting step selects any of the dot types corresponding to any of the tones represented by any of the pixel values larger than the pixel value.

Such a configuration leads to effects and advantages similar to the printing device of the eighteenth aspect by a computer reading a program and executing processes in accordance with the program.

Twenty-Ninth Aspect

According to a printing device control program of a twenty-ninth aspect, in any one of the twenty-fourth to twenty-seventh aspects, when the pixel values are density values, for the pixel value of the predetermined value being smaller than a predetermined pixel value, the dot type selecting step selects any of the dot types corresponding to any of the tones represented by any of the pixel values larger than the pixel value, and for the pixel value of the predetermined value being larger than the predetermined pixel value, the dot type selecting step selects any of the dot types corresponding to any of the tones represented by any of the pixel values smaller than the pixel value.

Such a configuration leads to effects and advantages similar to the printing device of the nineteenth aspect by a computer reading a program and executing processes in accordance with the program.

Thirtieth Aspect

According to a printing device control program of a thirtieth aspect, in any one of the twenty-fourth to twenty-seventh aspects, the characteristics information includes frequency information, and when the pixel values are density values, for any of the pixel values with a frequency being a predetermined frequency or lower in the characteristics information extracted from the acquired image data, when the pixel value of the predetermined value is smaller than a predetermined pixel value, the dot type selecting step selects any of the dot types corresponding to any of the tones represented by any of the pixel values smaller than the pixel value, and when the pixel value of the predetermined value is larger than the predetermined pixel value, the dot type selecting step selects any of the dot types corresponding to any of the tones represented by any of the pixel values larger than the pixel value.

Such a configuration leads to effects and advantages similar to the printing device of the twentieth aspect by a computer reading a program and executing processes in accordance with the program.

Thirty-First Aspect

A thirty-first aspect of the invention is directed to, for the aim of solving the above-described previous problems, a printing device control method for use for controlling a printing device provided with a printing head including a printed element that is capable of forming a plurality types of dots each corresponding to each of M tones ($M \geq 3$) represented by each pixel of an image. The printing device control method includes the steps of: acquiring image data of pixel values each representing each of the tones of the pixels of the image; selecting from the type-varying dots, for any of the pixel values of the acquired image data, any of the dot types corresponding to the tone of the pixel value; generating, based on the selection result derived for each of the pixel values, printing data in which each of the pixel values is defined by the dot type; and printing, based on the printing data, the image of the image data using the printing head.

This leads to the effects and advantages similar to the printing device of the eleventh aspect.

Thirty-Second Aspect

According to a printing device control method of a thirty-second aspect, in the thirty-first aspect, the type-varying dots are of different sizes corresponding to each of the M tones.

This leads to the effects and advantages similar to the printing device of the twelfth aspect.

Thirty-Third Aspect

According to a printing device control method of a thirty-third aspect, in the thirty-first aspect, the type-varying dots are of the same sizes but of different printing densities corresponding to each of the M tones.

This leads to the effects and advantages similar to the printing device of the thirteenth aspect.

Thirty-Fourth Aspect

According to a printing device control method of a thirty-fourth aspect, in any one of the thirty-first to thirty-third aspects, the dot type selecting step selects, for any of the pixel values of a predetermined value, any of the dot types corresponding to any of the tones different from the tone represented by the pixel value.

This leads to the effects and advantages similar to the printing device of the fourteenth aspect.

Thirty-Fifth Aspect

According to a printing device control method of a thirty-fifth aspect, in any one of the thirty-first to thirty-fourth aspects, a characteristics information extracting step is further included to extract characteristics information from the acquired image data. Based on the extracted characteristics information, the dot type selecting step selects, for any of the pixel values of the acquired image data showing predetermined details of the characteristic information, any of the dot types corresponding to any of the tones different from the tone of the pixel value.

This leads to the effects and advantages similar to the printing device of the fifteenth aspect.

Thirty-Sixth Aspect

According to a printing device control method of a thirty-sixth aspect, in the thirty-fifth aspect, an image type determining step is further included to determine an image type of the acquired image data based on the extracted characteristics information. Based on the determined image type, for any of the dot types corresponding to each of the M tones, the dot type selecting step determines a tone range for use for a selection process.

This leads to the effects and advantages similar to the printing device of the sixteenth aspect.

Thirty-Seventh Aspect

According to a printing device control method of a thirty-seventh aspect, in the thirty-fifth aspect, a print element property information acquiring step is further included to acquire print element property information representing properties of a print element configuring the printing head. Based on the acquired print element property information, for any of the dot types corresponding to each of the M tones, the dot type selecting step determines a tone range for use for a selection process.

This leads to the effects and advantages similar to the printing device of the seventeenth aspect.

Thirty-Eighth Aspect

According to a printing device control method of a thirty-eighth aspect, in any one of the thirty-fourth to thirty-seventh aspects, when the pixel values are density values, for the pixel value of the predetermined value being smaller than a predetermined pixel value, the dot type selecting step selects any of the dot types corresponding to any of the tones represented by any of the pixel values smaller than the pixel value, and for the pixel value of the predetermined value being larger than the predetermined pixel value, the dot type selecting step selects any of the dot types corresponding to any of the tones represented by any of the pixel values larger than the pixel value.

This leads to the effects and advantages similar to the printing device of the eighteenth aspect.

Thirty-Ninth Aspect

According to a printing device control method of a thirty-ninth aspect, in any one of the thirty-fourth to thirty-seventh aspects, when the pixel values are density values, for the pixel value of the predetermined value being smaller than a predetermined pixel value, the dot type selecting step selects any of the dot types corresponding to any of the tones represented by any of the pixel values larger than the pixel value, and for the pixel value of the predetermined value being larger than the predetermined pixel value, the dot type selecting step selects any of the dot types corresponding to any of the tones represented by any of the pixel values smaller than the pixel value.

This leads to the effects and advantages similar to the printing device of the nineteenth aspect.

Fortieth Aspect

According to a printing device control method of a fortieth aspect, in any one of the thirty-fourth to thirty-seventh aspects, the characteristics information includes frequency information, and when the pixel values are density values, for any of the pixel values with a frequency being a predetermined frequency or lower in the characteristics information extracted from the acquired image data, when the pixel value of the predetermined value is smaller than a predetermined pixel value, the dot type selecting step selects any of the dot types corresponding to any of the tones represented by any of the pixel values smaller than the pixel value, and when the pixel value of the predetermined value is larger than the predetermined pixel value, the dot type selecting step selects any of the dot types corresponding to any of the tones represented by any of the pixel values larger than the pixel value.

This leads to the effects and advantages similar to the printing device of the twentieth aspect.

Forty-First Aspect

A forty-first aspect of the invention is directed to, for the aim of solving the above-described previous problems, a printing data generation device that generates printing data for use in a printing device provided with a printing head including a printed element that is capable of forming a plurality types of dots each corresponding to each of M tones (M≧3) represented by each pixel of an image. The printing data generation device includes: an image data acquisition unit that acquires image data of pixel values each representing each of the tones of the pixels of the image; a dot type selection unit that selects from the type-varying dots, for any of the pixel values of the acquired image data, any of the dot types corresponding to the tone of the pixel value; and a printing data generation unit that generates, based on the selection result derived for each of the pixel values, printing data in which each of the pixel values is defined by the dot type.

That is, the forty-first aspect includes no such printing unit for actual printing as the above-described printing devices, but printing data is generated based on original multi-value image data, i.e., M-value image data.

Accordingly, such a configuration can lead to effects and advantages similar to the printing device of the eleventh aspect. For example, only by forwarding the generated printing data to a printing device, the printing device becomes able to execute a printing process. Accordingly, such a configuration eliminates the need to provide any specific printing device, and any existing inkjet printing device or sublimation printing device can be used as it is.

Furthermore, it allows the use of general-purpose information processors such as personal computers, and thus any existing printing system can be used as it is, being configured by a printing command device such as a personal computer, and an inkjet printer.

Forty-Second Aspect

According to a printing data generation device of a forty-second aspect, in the forty-first aspect, the type-varying dots are of different sizes corresponding to each of the M tones.

This leads to the effects and advantages similar to the printing device of the twelfth aspect.

Forty-Third Aspect

According to a printing data generation device of a forty-third aspect, in the forty-first aspect, the type-varying dots are of the same sizes but of different printing densities corresponding to each of the M tones.

This leads to the effects and advantages similar to the printing device of the thirteenth aspect.

Forty-Fourth Aspect

According to a printing data generation device of a forty-fourth aspect, in any one of the forty-first to forty-third aspects, the dot type selection unit selects, for any of the pixel values of a predetermined value, any of the dot types corresponding to any of the tones different from the tone represented by the pixel value.

This leads to the effects and advantages similar to the printing device of the fourteenth aspect.

Forty-Fifth Aspect

According to a printing data generation device of a forty-fifth aspect, in any one of the forty-first to forty-third aspects, a characteristics information extraction unit is further included to extract characteristics information from the acquired image data. Based on the extracted characteristics information, the dot type selection unit selects, for any of the pixel values of the acquired image data showing predetermined details of the characteristic information, any of the dot types corresponding to any of the tones different from the tone of the pixel value.

This leads to the effects and advantages similar to the printing device of the fifteenth aspect.

Forty-Sixth Aspect

According to a printing data generation device of a forty-sixth aspect, in the forty-fifth aspect, an image type determination unit is further included to determine an image type of the acquired image data based on the extracted characteristics information. Based on the determined image type, for any of the dot types corresponding to each of the M tones, the dot type selection unit determines a tone range for use for a selection process.

This leads to the effects and advantages similar to the printing device of the sixteenth aspect.

Forty-Seventh Aspect

According to a printing data generation device of a forty-seventh aspect, in the forty-fifth aspect, a print element property information acquisition unit is further included to acquire print element property information representing properties of a print element configuring the printing head. Based on the acquired print element property information, for any of the dot types corresponding to each of the M tones, the dot type selection unit determines a tone range for use for a selection process.

This leads to the effects and advantages similar to the printing device of the seventeenth aspect.

Forty-Eighth Aspect

According to a printing data generation device of a forty-eighth aspect, in any one of the forty-fourth to forty-seventh aspects, when the pixel values are density values, for the pixel value of the predetermined value being smaller than a predetermined pixel value, the dot type selection unit selects any of the dot types corresponding to any of the tones represented by any of the pixel values smaller than the pixel value, and for the pixel value of the predetermined value being larger than the predetermined pixel value, the dot type selection unit selects any of the dot types corresponding to any of the tones represented by any of the pixel values larger than the pixel value.

This leads to the effects and advantages similar to the printing device of the eighteenth aspect.

Forty-Ninth Aspect

According to a printing data generation device of a forty-ninth aspect, in any one of the forty-fourth to forty-seventh aspects, when the pixel values are density values, for the pixel value of the predetermined value being smaller than a predetermined pixel value, the dot type selection unit selects any of the dot types corresponding to any of the tones represented by any of the pixel values larger than the pixel value, and for the pixel value of the predetermined value being larger than the predetermined pixel value, the dot type selection unit selects any of the dot types corresponding to any of the tones represented by any of the pixel values smaller than the pixel value.

This leads to the effects and advantages similar to the printing device of the nineteenth aspect.

Fiftieth Aspect

According to a printing data generation device of a fiftieth aspect, in any one of the forty-fourth to forty-seventh aspects, the characteristics information includes frequency information, and when the pixel values are density values, for any of the pixel values with a frequency being a predetermined frequency or lower in the characteristics information extracted from the acquired image data, when the pixel value of the predetermined value is smaller than a predetermined pixel value, the dot type selection unit selects any of the dot types corresponding to any of the tones represented by any of the pixel values smaller than the pixel value, and when the pixel value of the predetermined value is larger than the predetermined pixel value, the dot type selection unit selects any of the dot types corresponding to any of the tones represented by any of the pixel values larger than the pixel value.

This leads to the effects and advantages similar to the printing device of the twentieth aspect.

Fifty-First Aspect

A fifty-first aspect of the invention is directed to, for the aim of solving the above-described previous problems, a printing data generation program that generates printing data for use in a printing device provided with a printing head including a printed element that is capable of forming a plurality types of dots each corresponding to each of M tones ($M \geq 3$) represented by each pixel of an image. The printing data generation program includes the steps of: acquiring image data of pixel values each representing each of the tones of the pixels of the image; selecting from the type-varying dots, for any of the pixel values of the acquired image data, any of the dot types corresponding to the tone of the pixel value; generating, based on the selection result derived for each of the pixel values, printing data in which each of the pixel values is defined by the dot type; and printing, based on the printing data, the image of the image data using the printing head.

Such a configuration leads to effects and advantages similar to the printing data generation device of the forty-first aspect by a computer reading a program and executing processes in accordance with the program.

Fifty-Second Aspect

According to a printing data generation program of a fifty-second aspect, in the fifty-first aspect, the type-varying dots are of different sizes corresponding to each of the M tones.

Such a configuration leads to effects and advantages similar to the printing data generation device of the forty-second aspect by a computer reading a program and executing processes in accordance with the program.

Fifty-Third Aspect

According to a printing data generation program of a fifty-third aspect, in the fifty-first aspect, the type-varying dots are of the same sizes but of different printing densities corresponding to each of the M tones.

Such a configuration leads to effects and advantages similar to the printing data generation device of the forty-third aspect by a computer reading a program and executing processes in accordance with the program.

Fifty-Fourth Aspect

According to a printing data generation program of a fifty-fourth aspect, in any one of the fifty-first to fifty-third aspects, the dot type selecting step selects, for any of the pixel values of a predetermined value, any of the dot types corresponding to any of the tones different from the tone represented by the pixel value.

Such a configuration leads to effects and advantages similar to the printing data generation device of the forty-fourth aspect by a computer reading a program and executing processes in accordance with the program.

Fifty-Fifth Aspect

According to a printing data generation program of a fifty-fifth aspect, in any one of the fifty-first to fifty-fourth aspects, a program is further included for a computer to go through a characteristics information extracting step of extracting characteristics information from the acquired image data. Based on the extracted characteristics information, the dot type selecting step selects, for any of the pixel values of the acquired image data showing predetermined details of the characteristic information, any of the dot types corresponding to any of the tones different from the tone of the pixel value.

Such a configuration leads to effects and advantages similar to the printing data generation device of the forty-fifth aspect by a computer reading a program and executing processes in accordance with the program.

Fifty-Sixth Aspect

According to a printing data generation program of a fifty-sixth aspect, in any one of the fifty-first to fifty-fourth aspects, a program is further included for a computer to go through an image type determining step of determining an image type of the acquired image data based on the extracted characteristics information. Based on the determined image type, for any of the dot types corresponding to each of the M tones, the dot type selecting step determines a tone range for use for a selection process.

Such a configuration leads to effects and advantages similar to the printing data generation device of the forty-sixth aspect by a computer reading a program and executing processes in accordance with the program.

Fifty-Seventh Aspect

According to a printing data generation program of a fifty-seventh aspect, in the fifty-sixth aspect, a program is further included for a computer to go through a print element property information acquiring step of acquiring print element property information representing properties of a print element configuring the printing head. Based on the acquired print element property information, for any of the dot types corresponding to each of the M tones, the dot type selecting step determines a tone range for use for a selection process.

Such a configuration leads to effects and advantages similar to the printing data generation device of the forty-seventh aspect by a computer reading a program and executing processes in accordance with the program.

Fifty-Eighth Aspect

According to a printing data generation program of a fifty-eighth aspect, in any one of the fifty-fourth to fifty-seventh aspects, when the pixel values are density values, for the pixel value of the predetermined value being smaller than a predetermined pixel value, the dot type selecting step selects any of the dot types corresponding to any of the tones represented by any of the pixel values smaller than the pixel value, and for the pixel value of the predetermined value being larger than the predetermined pixel value, the dot type selecting step selects any of the dot types corresponding to any of the tones represented by any of the pixel values larger than the pixel value.

Such a configuration leads to effects and advantages similar to the printing data generation device of the forty-eighth aspect by a computer reading a program and executing processes in accordance with the program.

Fifty-Ninth Aspect

According to a printing data generation program of a fifty-ninth aspect, in any one of the fifty-fourth to fifty-seventh aspects, when the pixel values are density values, for the pixel value of the predetermined value being smaller than a predetermined pixel value, the dot type selecting step selects any of the dot types corresponding to any of the tones represented by any of the pixel values larger than the pixel value, and for the pixel value of the predetermined value being larger than the predetermined pixel value, the dot type selecting step selects any of the dot types corresponding to any of the tones represented by any of the pixel values smaller than the pixel value.

Such a configuration leads to effects and advantages similar to the printing data generation device of the forty-ninth aspect by a computer reading a program and executing processes in accordance with the program.

Sixtieth Aspect

According to a printing data generation program of a sixtieth aspect, in any one of the fifty-fourth to fifty-seventh aspects, the characteristics information includes frequency information, and when the pixel values are density values, for any of the pixel values with a frequency being a predetermined frequency or lower in the characteristics information extracted from the acquired image data, when the pixel value of the predetermined value is smaller than a predetermined pixel value, the dot type selecting step selects any of the dot types corresponding to any of the tones represented by any of the pixel values smaller than the pixel value, and when the pixel value of the predetermined value is larger than the predetermined pixel value, the dot type selecting step selects any of the dot types corresponding to any of the tones represented by any of the pixel values larger than the pixel value.

Such a configuration leads to effects and advantages similar to the printing data generation device of the fiftieth aspect by a computer reading a program and executing processes in accordance with the program.

Sixty-First Aspect

A sixty-first aspect of the invention is directed to, for the aim of solving the above-described previous problems, a printing data generation method that generates printing data for use in a printing device provided with a printing head including a printed element that is capable of forming a plurality types of dots each corresponding to each of M tones ($M \geq 3$) represented by each pixel of an image. The printing data generation method includes the steps of: acquiring image data of pixel values each representing each of the tones of the pixels of the image; selecting from the type-varying dots, for any of the pixel values of the acquired image data, any of the dot types corresponding to the tone of the pixel value; generating, based on the selection result derived for each of the pixel values, printing data in which each of the pixel values is defined by the dot type; and printing, based on the printing data, the image of the image data using the printing head.

This leads to the effects and advantages similar to the printing data generation device of the forty-first aspect.

Sixty-Second Aspect

According to a printing data generation method of a sixty-second aspect, in the sixty-first aspect, the type-varying dots are of different sizes corresponding to each of the M tones.

This leads to the effects and advantages similar to the printing data generation device of the forty-second aspect.

Sixty-Third Aspect

According to a printing data generation method of a sixty-third aspect, in the sixty-first aspect, the type-varying dots are of the same sizes but of different printing densities corresponding to each of the M tones.

This leads to the effects and advantages similar to the printing data generation device of the forty-third aspect.

Sixty-Fourth Aspect

According to a printing data generation method of a sixty-fourth aspect, in any one of the sixty-first to sixty-third aspects, the dot type selecting step selects, for any of the pixel values of a predetermined value, any of the dot types corresponding to any of the tones different from the tone represented by the pixel value.

This leads to the effects and advantages similar to the printing data generation device of the forty-fourth aspect.

Sixty-Fifth Aspect

According to a printing data generation method of a sixty-fifth aspect, in any one of the sixty-first to sixty-fourth aspects, a characteristics information extracting step is further included to extract characteristics information from the acquired image data. Based on the extracted characteristics information, the dot type selecting step selects, for any of the pixel values of the acquired image data showing predetermined details of the characteristic information, any of the dot types corresponding to any of the tones different from the tone of the pixel value.

This leads to the effects and advantages similar to the printing data generation device of the forty-fifth aspect.

Sixty-Sixth Aspect

According to a printing data generation method of a sixty-sixth aspect, in any one of the sixty-first to sixty-fourth aspects, an image type determining step is further included to determine an image type of the acquired image data based on the extracted characteristics information. Based on the determined image type, for any of the dot types corresponding to each of the M tones, the dot type selecting step determines a tone range for use for a selection process.

This leads to the effects and advantages similar to the printing data generation device of the forty-sixth aspect.

Sixty-Seventh Aspect

According to a printing data generation method of a sixty-seventh aspect, in the sixty-fifth aspect, a print element property information acquiring step is further included to acquire print element property information representing properties of a print element configuring the printing head. Based on the acquired print element property information, for any of the dot types corresponding to each of the M tones, the dot type selecting step determines a tone range for use for a selection process.

This leads to the effects and advantages similar to the printing data generation device of the forty-seventh aspect.

Sixty-Eighth Aspect

According to a printing data generation method of a sixty-eighth aspect, in any one of the sixty-fourth to sixty-seventh aspects, when the pixel values are density values, for the pixel value of the predetermined value being smaller than a predetermined pixel value, the dot type selecting step selects any of the dot types corresponding to any of the tones represented by any of the pixel values smaller than the pixel value, and for the pixel value of the predetermined value being larger than the predetermined pixel value, the dot type selecting step selects any of the dot types corresponding to any of the tones represented by any of the pixel values larger than the pixel value.

This leads to the effects and advantages similar to the printing data generation device of the forty-eighth aspect.

Sixty-Ninth Aspect

According to a printing data generation method of a sixty-ninth aspect, in any one of the sixty-fourth to sixty-seventh aspects, when the pixel values are density values, for the pixel value of the predetermined value being smaller than a predetermined pixel value, the dot type selecting step selects any of the dot types corresponding to any of the tones represented by any of the pixel values larger than the pixel value, and for the pixel value of the predetermined value being larger than the predetermined pixel value, the dot type selecting step selects any of the dot types corresponding to any of the tones represented by any of the pixel values smaller than the pixel value.

This leads to the effects and advantages similar to the printing data generation device of the forty-ninth aspect.

Seventieth Aspect

According to a printing data generation method of a seventieth aspect, in any one of the sixty-fourth to sixty-seventh aspects, the characteristics information includes frequency information, and when the pixel values are density values, for any of the pixel values with a frequency being a predetermined frequency or lower in the characteristics information extracted from the acquired image data, when the pixel value of the predetermined value is smaller than a predetermined pixel value, the dot type selecting step selects any of the dot types corresponding to any of the tones represented by any of the pixel values smaller than the pixel value, and when the pixel value of the predetermined value is larger than the predetermined pixel value, the dot type selecting step selects any of the dot types corresponding to any of the tones represented by any of the pixel values larger than the pixel value.

This leads to the effects and advantages similar to the printing data generation device of the fiftieth aspect.

Seventy-First Aspect

A seventy-first aspect of the invention is directed to, for the aim of solving the above-described previous problems, a computer-readable printing-device-control-program-recorded recording medium that is recorded with the printing device control program of any one of the twenty-first to thirtieth aspects.

This leads to effects and advantages similar to the printing device control program of any one of the twenty-first to thirtieth aspects, and enables easy provision of the printing program via recording media such as CD-ROMs, DVD-ROMs, and FDs (Flexible Disks).

Seventy-Second Aspect

A seventy-second aspect of the invention is directed to, for the aim of solving the above-described previous problems, a computer-readable printing-data-generation-program-recorded recording medium that is recorded with the printing data generation program of any one of the fifty-first to sixtieth aspects.

This leads to effects and advantages similar to the printing device control program of any one of the fifty-first to sixtieth aspects, and enables easy provision of the printing program via recording media such as CD-ROMs, DVD-ROMs, and FDs.

BRIEF DESCRIPTION OF THE DRAWINGS

The invention will be described with reference to the accompanying drawings, wherein like numbers reference like elements.

FIG. 3 is a diagram showing a printing head unit for image printing.

FIG. 4 is a diagram showing nozzles provided to the printing head unit.

FIG. 5 is a diagram showing the relationship between tones of pixels and dot sizes.

FIG. 9 is a diagram showing the tones of pixels in an image of the first embodiment.

FIG. 10 is a diagram showing the relationship between the tones of pixels and the dot sizes in a modified example 1 of the first embodiment.

DESCRIPTION OF EXEMPLARY EMBODIMENTS

First Embodiment

By referring to the accompanying drawings, a first embodiment of a printing device of the invention is described.

Configuration

Figure 1:
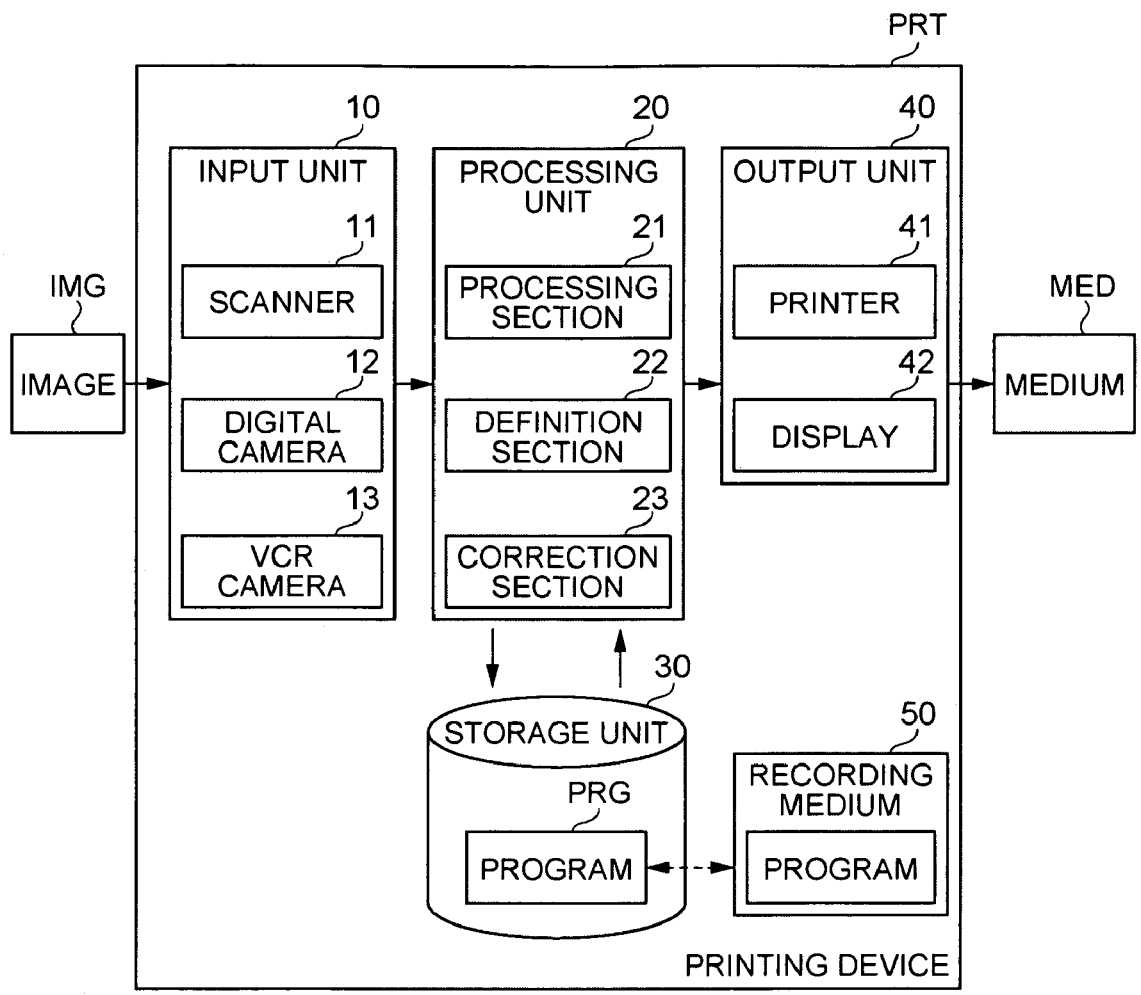
FIG. 1 is a diagram showing the configuration of a printing device.
Figure 2:
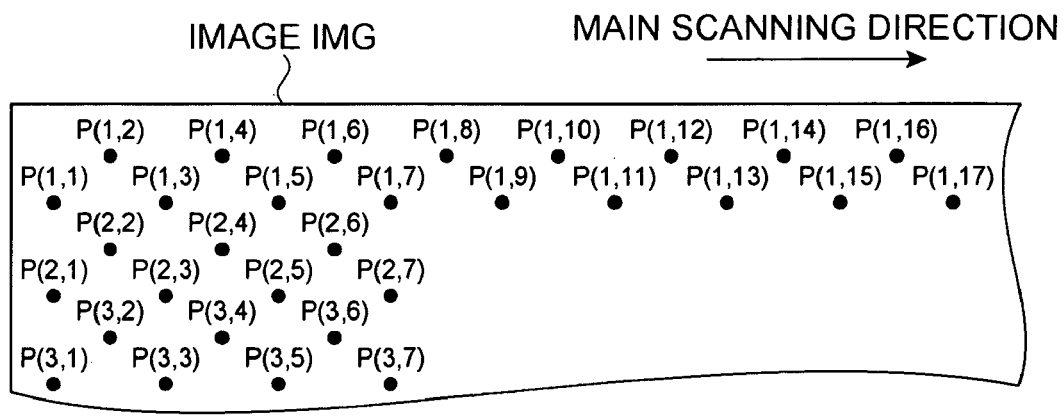
FIG. 2 is a diagram showing an image to be printed by the printing device.

FIG. 1 shows the configuration of a printing device of the first embodiment, FIG. 2 shows an image to be printed by the printing device of the first embodiment, FIG. 3 shows a printing head unit for image printing in the first embodiment, and FIG. 4 shows nozzles provided to the printing head unit of the first embodiment.

As shown in FIG. 1, a printing device PRT of the first embodiment is configured to include an input unit 10, a processing unit 20, a storage unit 30, and an output unit 40. Under the control of a computer (program included), the printing device PRT prints an image IMG (refer to FIG. 2) to a medium MED using eight nozzles N(1), N(2), and others (refer to FIG. 4). The image IMG has pixels of P(1,1), P(1,2), P(1,3) and others in matrix. A plurality of printing head units PHU(1), PHU(2), PHU(3), and others are disposed fully along the length of the medium MED in a main scanning direction (refer to FIG. 3), and for each of the PHUs, the eight nozzles N are disposed along the main scanning direction.

The pixels P in the image IMG of FIGS. 1 and 2 are each correlated to the nozzles N of the printing head units PHU in the printing device PRT of FIGS. 3 and 4. For example, the pixel P(1,1) is correlated to the nozzle N(1) of the printing head unit PHU(1), the pixel P(1,2) to the nozzle N(2) of the printing head unit PHU(2), the pixel P(1,3) to the nozzle N(3) of the printing head unit PHU(1), the pixel P(1,8) to the nozzle N(8) of the printing head unit PHU(1), and the pixel P(1,9) to the nozzle N(1) of the printing head unit PHU(2).

Figure 6:
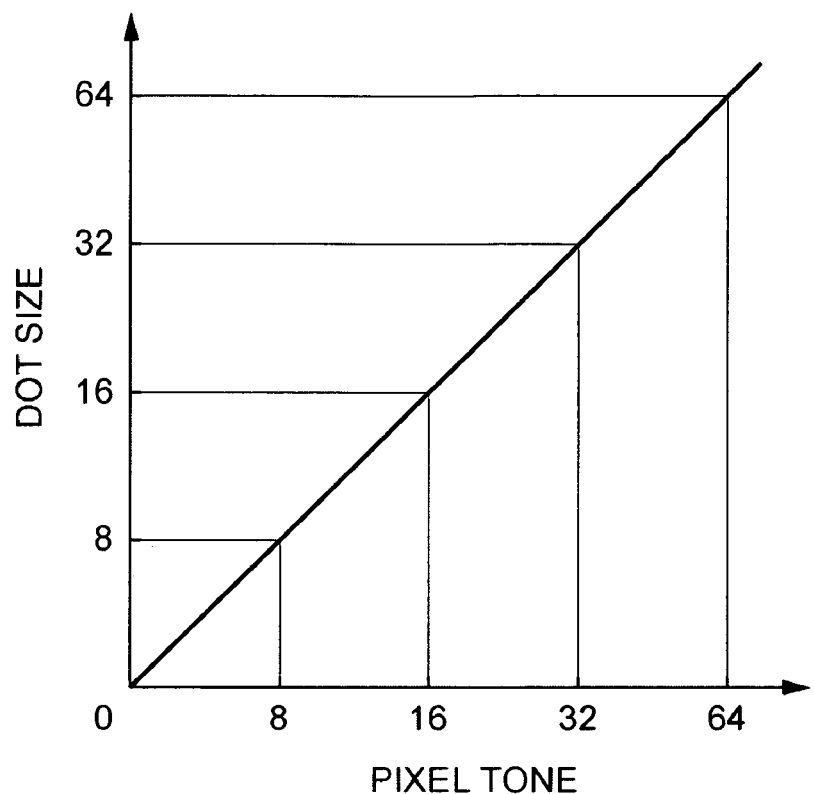
FIG. 6 is a graph showing the relationship between the tones of pixels and the dot sizes.

FIGS. 5 and 6 show the diagram and graph showing the relationship between tones of pixels and dot sizes, respectively. As shown in FIGS. 5 and 6, the pixels P(1,1), P(1,2), P(1,3), and others represent each of M tones (M≧3) precisely, any one tone of 64 tones. The tone is displayed by the nozzles N(1), N(2), N(3), and others of the printing head units PHU(1), PHU(2), PHU(3), and others discharging, i.e., printing, dots (droplets) D of a size for the tone on the medium MED. Assuming here that the tone for the pixel P(1,2) is "tone 3", the "tone 3" is printed on the medium MED by the nozzle N(2) of the printing head unit PHU(1) corresponding to the pixel P(1,1) discharging the droplet of "size 3".

The printing head unit PHU discharges ink droplets from the nozzles N(1), N(2), N(3), and others using piezoelectric elements such as piezo actuators, which are not shown, so that circular dots are printed on the medium MED. The ink droplets are filled in ink chambers, which are not shown, provided to each of the nozzles N(1), N(2), N(3), and others. The piezoelectric element is provided to each of the ink chambers.

The voltage for application to the piezoelectric elements is controlled with various levels so that the discharge amount of the ink droplets from the ink chambers is controlled. Through such control, dots to be printed can be changed in size for each of the nozzles N (1), N(2), N(3), and others. Alternatively, two levels of voltage may be applied to the nozzles sequentially in a short time, and the resulting two discharges may be combined on the medium MED to configure one dot. With this being the case, utilizing the fact that the discharge speed varies depending on the dot size, dots may be formed first with a small ink quantity and then with a large ink quantity so that ink droplets are discharged on the medium MED substantially at the same time. In this manner, the resulting dot can become larger in size.

The input unit 10 is exemplified by a scanner 11, a digital camera 12, a VCR camera 13, or others, and is used to convert an image IMG into bit map data, for example, for provision to the processing unit 20 in the subsequent stage. Here, it does not matter if the image IMG is a still image or a moving image.

The processing unit 20 is configured by a processing section 21, a definition section 22, and a correction section 23.

The processing section 21 subjects the image IMG provided by the input unit 10 to processing of tone, i.e., resolution or color notation system, e.g., CMYK or RGB.

The definition section 22 operates in relation to a tone curve TC of FIG. 6, showing the relationship between the tones of the pixels P and the sizes of the dots D. More in detail, from a plurality of tone curves TC of FIGS. 6, 12A, and 12B, for example, the definition section 22 selects any one appropriate tone curve TC in consideration of the details of the image IMG, e.g., natural image, character string, or combination of natural image and character string. The definition section 22 also defines the range for use, i.e., upper or lower limit, for any one specific tone curve in consideration of the surroundings of the printing device PRT, e.g., temperature or humidity, the operating state of the printing device PRT, e.g., discharge quality of ink droplets from nozzles.

In accordance with the tone curve TC selected or defined as such, the correction unit 23 determines the sizes of the dots D for the tones of the pixels P, i.e., adjusts the sizes of the dots D. More specifically, assuming here that the tone for the pixel P(1,2) is "tone 8", with the tone curve TC of FIGS. 5 and 6, the correction section 23 determines the droplet of "size 8". With the tone curve TC of FIG. 12A, determined is the droplet of "size 5", and with the tone curve TC of FIG. 12B, determined is the droplet of "size 11". That is, information about the size of the dot D for each of the pixels P is used as a basis to generate data defining the size of the dot D for the tone value of each of the pixels P, i.e., printing data. The resulting printing data is forwarded to the output unit 40.

The storage unit 30 temporarily stores the image IMG, and is installed with a program PRG from a computer-readable recording medium 50 such as flexible disk or CD-ROM. The program PRG includes steps of FIG. 8, and defines the processes for execution by the printing device PRT.

The output unit 40 is configured by a printer 41, a display (liquid crystal, CRT (cathode-ray tube)) 42, or others, and is used to print or display the image IMG on the medium MED. Here, the image IMG is the one having been through with tone processing by the processing unit 20, and tone correction based on the tone curve TC. The printer 41 includes a plurality of printing head units PHU(1), PHU(2), PHU(3), and others as shown in FIG. 3, and each of the printing head units PHU(1), PHU(2), PHU(3), and others is provided with eight nozzles N(1) to N(8) as shown in FIG. 4 for discharging ink droplets therefrom.

Figure 7:
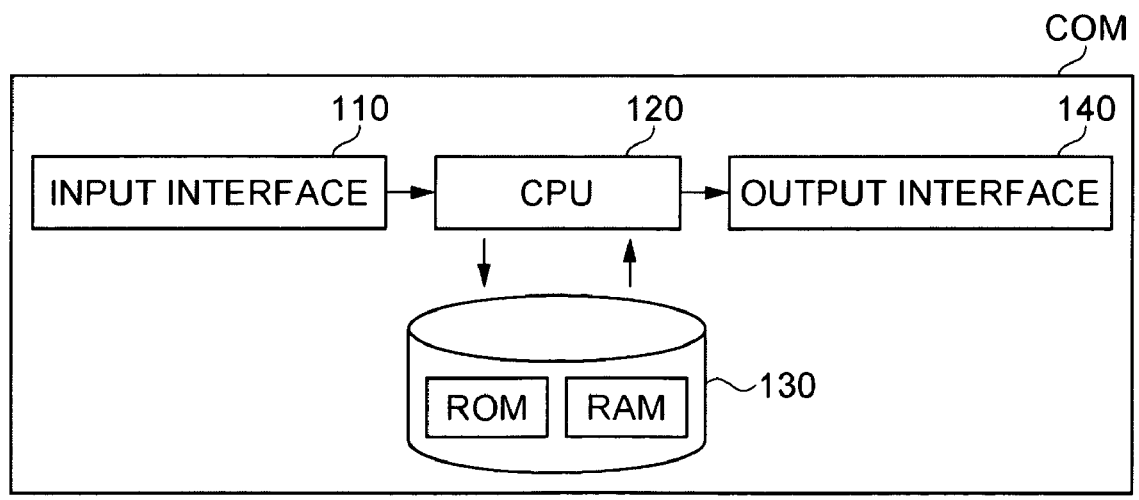
FIG. 7 is a diagram showing the configuration of a computer device.

FIG. 7 shows the configuration of a general computer device COM. The computer device COM of FIG. 7 is associated with the printing device PRT of FIG. 1, i.e., the input unit 10 of FIG. 1 is configured by an input interface 110 of FIG. 7, the processing unit 20 of FIG. 1 by a CPU 120 of FIG. 7, the storage unit 30 of FIG. 1 by ROM/RAM 130 of FIG. 7, and the output unit 40 of FIG. 1 by an output interface 140 of FIG. 7.

Operation

Figure 8:
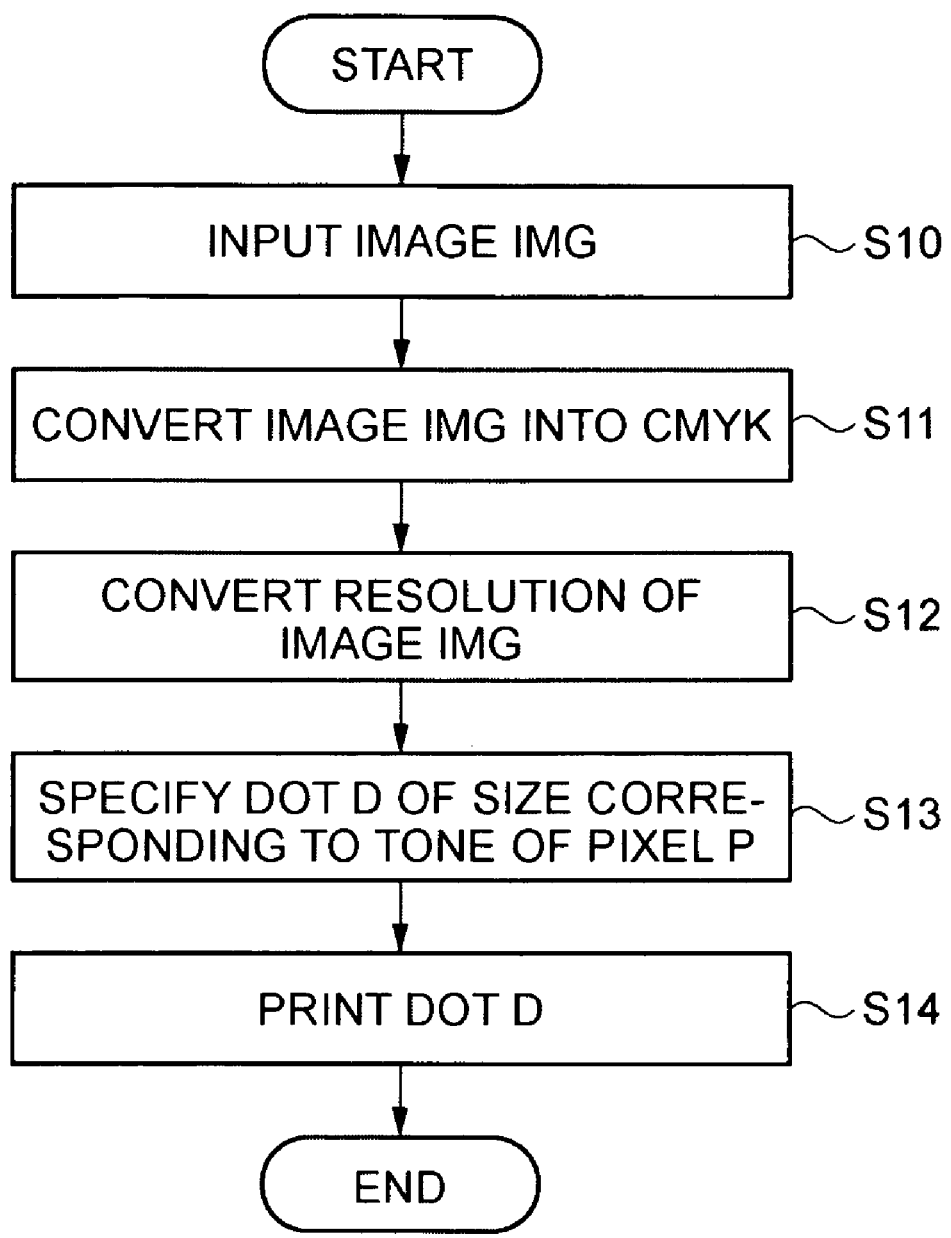
FIG. 8 is a flowchart showing the operation of a printing device of a first embodiment.

FIG. 8 is a flowchart of the operation of the printing device of the first embodiment. FIG. 9 shows the tones of pixels in an image of the first embodiment. By referring to the flowchart of FIG. 8, described now is the operation of the printing device PRT of the first embodiment. For the sake of clarity, as shown in FIG. 9, assumed here is that the pixels of P(1,1), P(1,2), P(1,3), and others in an incoming image IMG are respectively assigned with tones of 3, 52, 41, and others out of 64 tones from 1 to 64.

Step S10: A user of the printing device PRT uses the input unit 10 for input of an image IMG.

Step S11: When the image IMG is input, the processing section 21 in the processing unit 20 converts the color system of the image IMG, i.e., converts additive colors of RGB to subtractive colors of CMYK as previously known.

Step S12: The processing section 21 also changes the resolution of the image IMG to make it suit to the nozzles N(1) to N(8) of the printing head units PHU(1), PHU(2), PHU(3), and others with any previously-known method.

Step S13: In accordance with the relationship between the tones of the pixels P and the sizes of the dots D, i.e., tone curve, of FIGS. 5 and 6, the correction section 23 specifies the dot D of "size 3" for the "tone 3" of the pixel P(1,1) in the image IMG of FIG. 9. Similarly, the correction section 23 sequentially makes such a specification, i.e., the dot D of "size 52" for the "tone 52" of the pixel P(1,2), the dot D of "size 41" for the "tone 41" of the pixel P(1,3), and the like.

Step S14: For display of "tone 3" of the pixel P(1,1) "tone 52" of the pixel P(1,2), "tone 41" of the pixel P(1,3) and others on the medium MED, the printer 41 prints the dot D of "size 3", the dot D of "size 52", the dot D of "size 41", and others using the nozzle N(1) of the printing head unit PHU(1), the nozzle N(2) of the printing head unit PHU(1), the nozzle N(3) of the printing head unit PHU(1), and others.

Effects

As described above, with the printing device PRT of the first embodiment, the correction section 23 specifies the dot D of "size 3", the dot D of "size 52", the dot D of "size 41", and others for the pixels P (1,1), P (1,2), P (1,3), and others in the image IMG in accordance with the relationship between the tones of the pixels P and the sizes of the dots. The printer 41 prints, on the medium MED, thus specified dot D of "size 3", dot D of "size 52", dot D of "size 41", and others using the nozzle N(1) of the printing head unit PHU(1), the nozzle N(2) of the printing head unit PHU(1), the nozzle N(3) of the printing head unit PHU(1), and others. The resulting medium MED thus displays the tones of the pixels P in the image IMG on a dot basis.

In the first embodiment, the process of selecting a tone curve TC in the definition section 22 and the correction section 23, and the process of determining the size of the dot D for each of the pixels P are corresponding to the dot type selection unit of any one of the eleventh, fourteenth, eighteenth, nineteenth, forty-first, forty-fourth, forty-eighth, and forty-ninth aspects. The correction section 23 corresponds to the printing data generation unit of the eleventh or forty-first aspects, and the printer 41 corresponds to the printing unit of the eleventh aspect.

Modified Example 1 of First Embodiment

Figure 11:
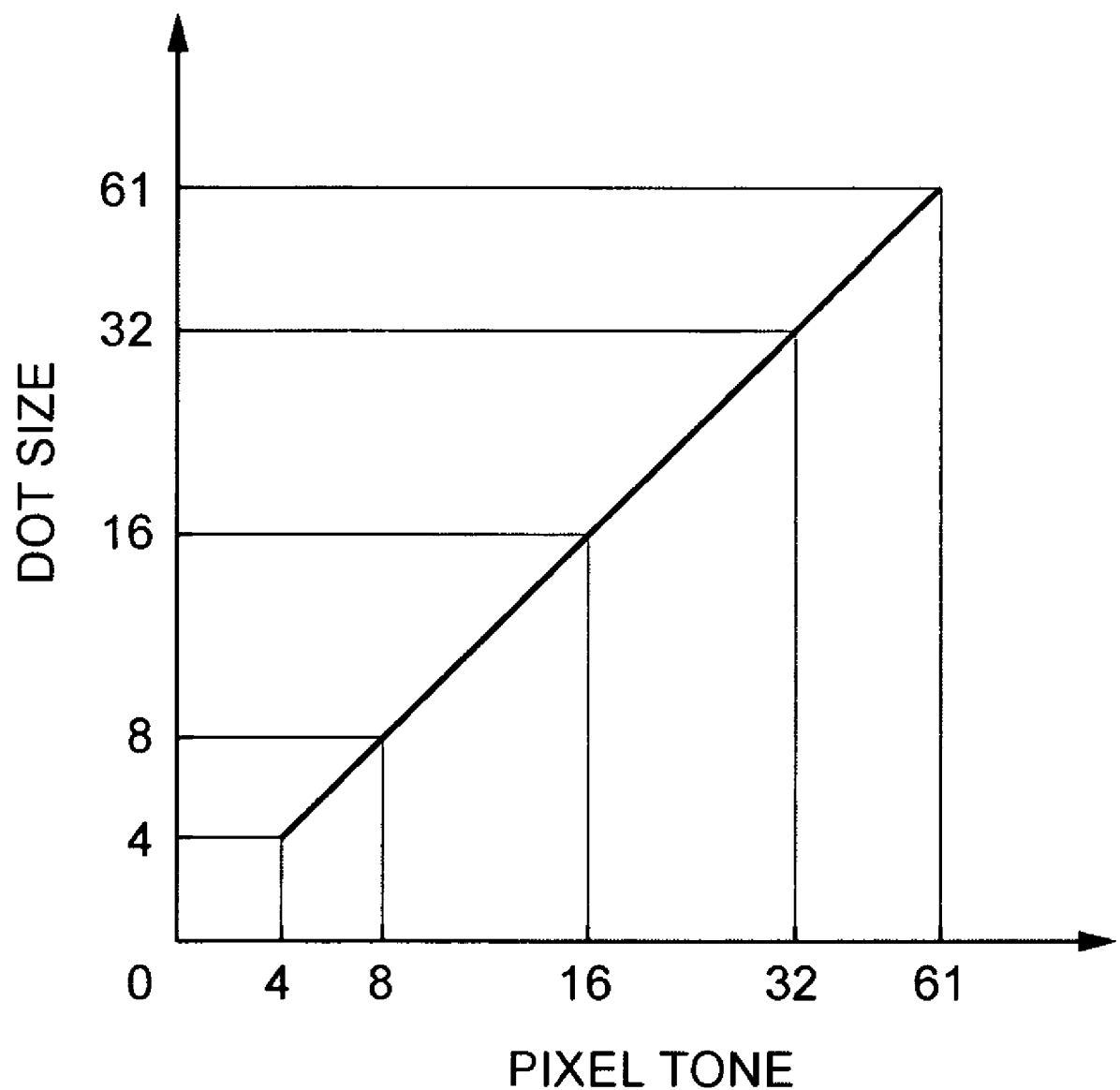
FIG. 11 is a graph showing the relationship between the tones of pixels and the dot sizes in the modified example 1 of the first embodiment.

As an alternative to the relationship between the tones of the pixels P and the sizes of the dots D of FIGS. 5 and 6, the following manner is also an option. That is, as measures against any possible problem at the time of printing on the medium MED by the printing device PRT as shown in FIGS. 10 and 11, e.g., in view of discharge quality of ink droplets affected by the surroundings of the printing device PRT, e.g., temperature or humidity, the upper and lower limits are defined. With such definition, the relationship between the tones of the pixels P and the sizes of the dots D may tell not to use the sizes of 1, 2, 3, 62, 63, 64 corresponding to the tones of 1, 2, 3, 62, 63, and 64. This leads to the effects similar to the above, and precludes the possibility of causing the tones of the dots D to be printed on the medium MED to look different from the input image IMG due to the ink droplet discharge failure.

As to such definition of upper and lower limits, there is no need to equalize the use-prohibited number of tones for the upper and lower limits, and to fix the use-allowed number of tones. For example, two tones of 1 and 2 may be prohibited for use as the lower limit, and five tones of 60, 61, 62, 63, and 64 may be prohibited for use as the upper limit. Alternatively, the use-allowed number of tones may not be fixed to 58 (=64−(3+3)), and may be changed to 32 or 48, for example. These also lead to the similar effects as described above.

In the modified example 1 of the first embodiment, the process of selecting a tone curve TC in the definition section 22 and the correction section 23, and the process of determining the size of the dot D for each of the pixels P are corresponding to the dot type selection unit of the eleventh, fourteenth, seventeenth, eighteenth, nineteenth, forty-first, forty-fourth, forty-seventh, forty-eighth, and forty-ninth aspects. The correction section 23 corresponds to the printing data generation unit of the eleventh or forty-first aspects, and the printer 41 corresponds to the printing unit of the eleventh aspect.

Modified Example 2 of First Embodiment

Figure 12A:
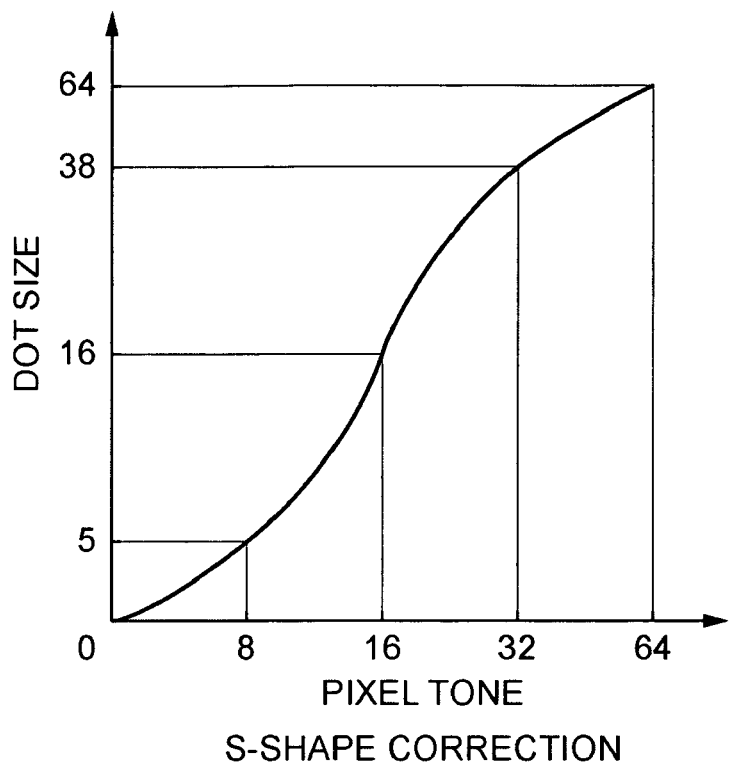
FIG. 12A is a diagram showing an S-shaped correction tone curve of a modified example 2 of the first embodiment.

As an alternative to the graph of FIG. 6 showing the relationship between the tones of the pixels P and the sizes of the dots D, an S-shaped correction tone curve of FIG. 12A may be used so that the details of the image IMG to be printed on the medium MED can be increased in contrast. On the contrary, using an inverted-S-shaped tone curve of FIG. 12B enables to reduce the contrast of the details of the image IMG to be printed on the medium MED.

In the modified example 2 of the first embodiment, the process of selecting a tone curve TC in the definition section 22 and the correction section 23, and the process of determining the size of the dot D for each of the pixels P are corresponding to the dot type selection unit of the eleventh, fourteenth, sixteenth, eighteenth, nineteenth, forty-first, forty-fourth, forty-sixth, forty-eighth, and forty-ninth aspects. The correction section 23 corresponds to the printing data generation unit of the eleventh or forty-first aspects, and the printer 41 corresponds to the printing unit of the eleventh aspect.

Modified Example 3 of First Embodiment

Figure 13A:
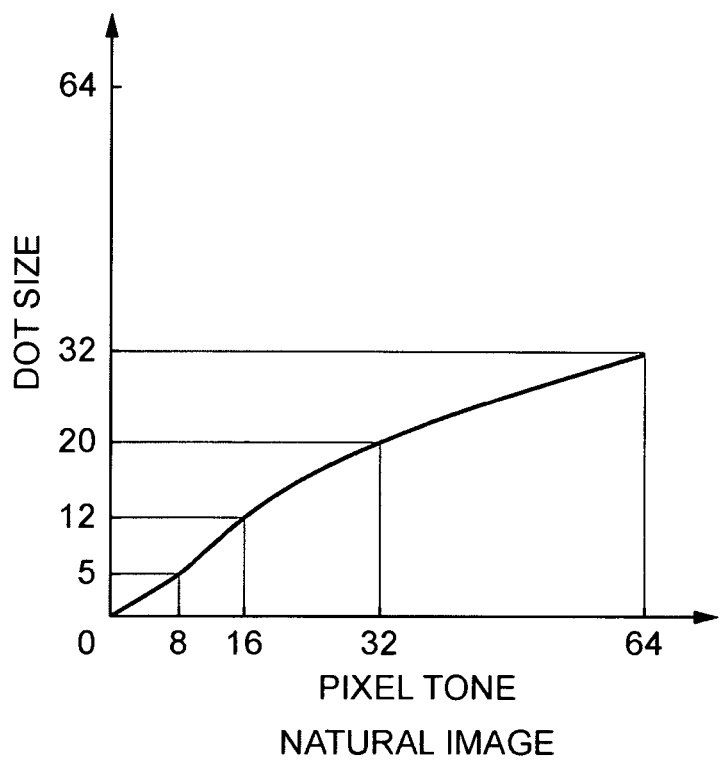
FIG. 13A is a diagram showing the relationship between a natural image and the dot sizes in a modified example 3 of the first embodiment.

As an alternative to the graph of FIG. 6 showing the relationship between the tones of the pixels P and the sizes of the dots D, the following manner is also an option. That is, when the details of the input image IMG are a natural image, i.e., image details corresponding to a photo, as shown in FIG. 13A, the size of the dots D is entirely reduced than they are supposed to be as specified by the relationship of FIG. 6. For example, the graph of FIG. 6 tells that "tone 8" is supposed to be assigned to the dot D of "size 8", but used is the dot D of "size 5" following the graph of FIG. 13A. The graph of FIG. 6 tells that "tone 32" is supposed to be assigned to the dot D of "size 32", but used is the dot D of "size 20" following the graph of FIG. 13A.

Figure 13B:
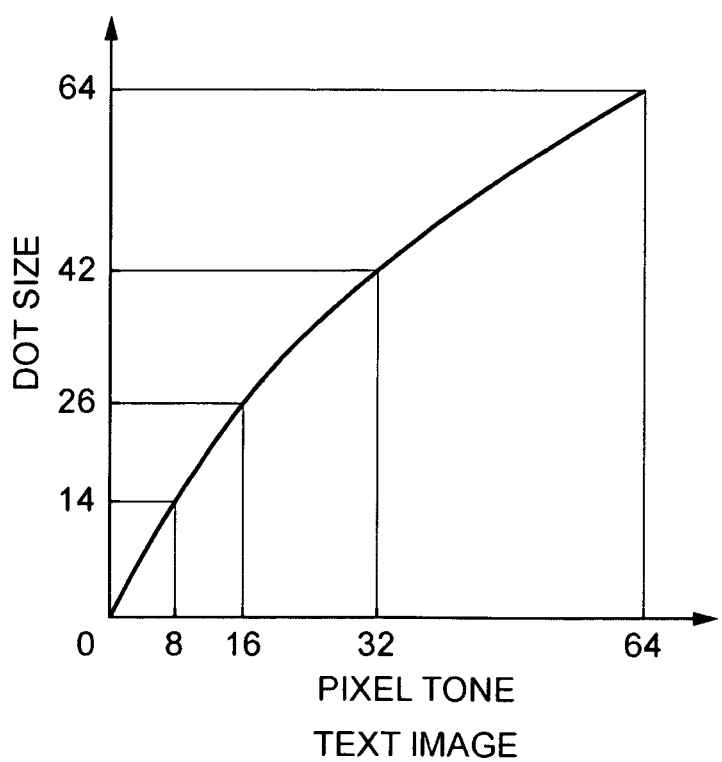
FIG. 13B is a diagram showing the relationship between a text image and the dot sizes in the modified example 3 of the first embodiment.

When the details of the image IMG are letters and characters as shown in FIG. 13B, the size of the dots D is entirely increased than they are supposed to be as specified by the relationship of FIG. 6. For example, the graph of FIG. 6 tells that "tone 8" is supposed to be assigned to the dot D of "size 8", but used is the dot D of "size 14" following the graph of FIG. 13B. The graph of FIG. 6 tells that "tone 32" is supposed to be assigned to the dot D of "size 32", but used is the dot D of "size 42" following the graph of FIG. 13B.

As such, the size corresponding to the tone is changed based on whether the image IMG is a natural image or letters and characters so that the effects similar to the above can be derived. Moreover, the natural image can be printed on the medium MED with high resolution, and the letters and characters can be printed thereto with clarity. When the image IMG includes both a natural image and letters and characters, a graph for use such a case may be the one being intermediate between the graph of FIG. 13A and that of FIG. 13B, whereby the natural image in the image IMG can be printed with high resolution, and the letters and characters therein can be printed with clarity.

In the modified example 3 of the first embodiment, the process of selecting a tone curve TC in the definition section 22 and the correction section 23, and the process of determining the size of the dot D for each of the pixels P are corresponding to the dot type selection unit of the eleventh, fourteenth, fifteenth, eighteenth, nineteenth, forty-first, forty-fourth, forty-fifth, forty-eighth, and forty-ninth aspects. The correction section 23 corresponds to the printing data generation unit of the eleventh or forty-first aspects, and the printer 41 corresponds to the printing unit of the eleventh aspect.

Second Embodiment

Figure 14:
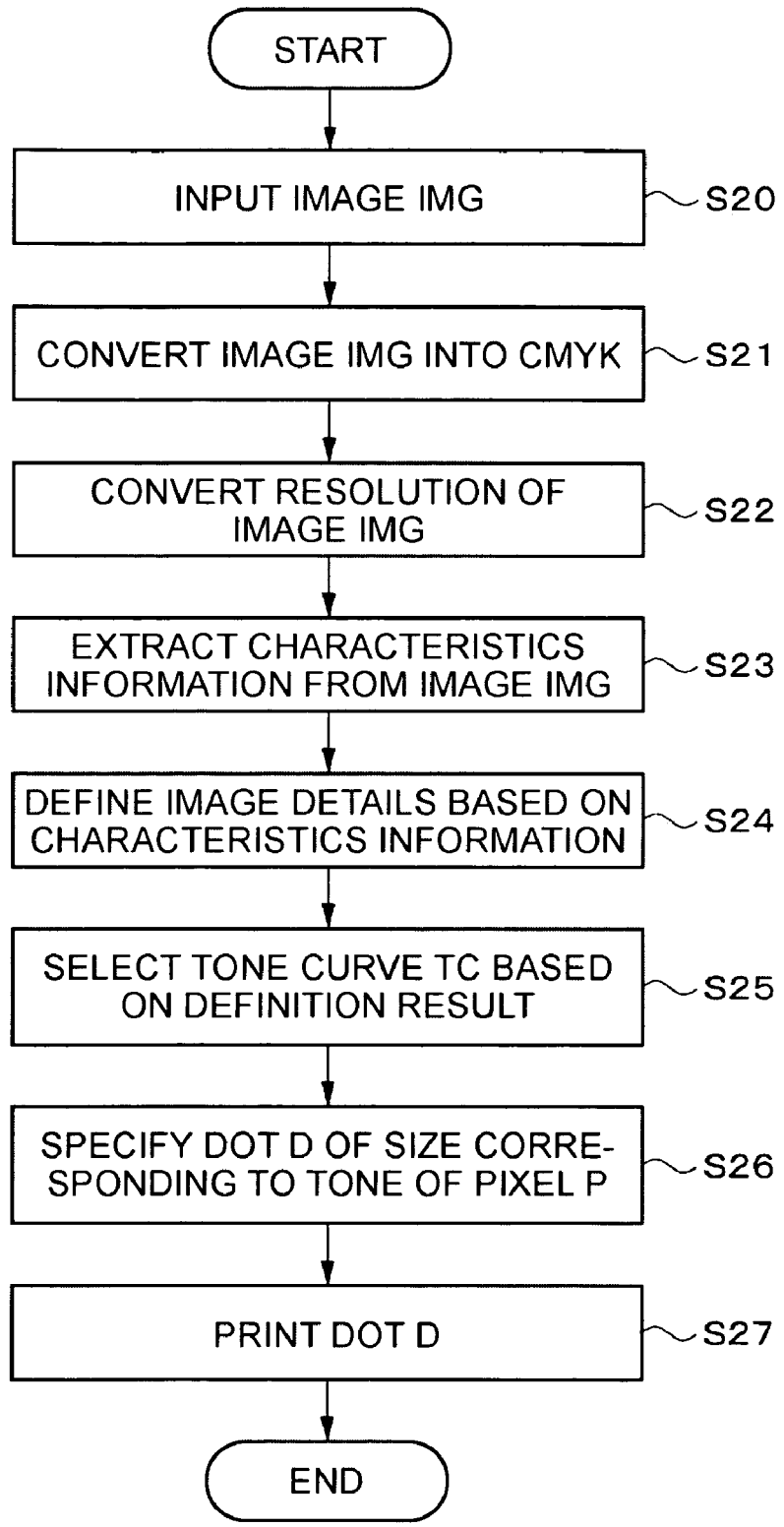
FIG. 14 is a flowchart of the operation of a printing device of a second embodiment.

By referring to the accompanying drawings, described next is a second embodiment of the printing device of the invention. FIG. 14 is a diagram showing a second embodiment of the printing device of the invention.

The configuration of a printing device of this embodiment is similar to that of the first embodiment of FIG. 1, and the configuration of a computer device of this embodiment is similar to that of the first embodiment of FIG. 7. In this embodiment, differences from the first embodiment lie in the definition section 22 of FIG. 1, i.e., characteristics information is extracted from an image IMG, the image IMG is defined by details (e.g., natural image, text image, or combination of natural image and text image) based on the extracted characteristics information, and based on the definition result, a tone curve TC is selected from a plurality of those for use for correction in the correction section 23. In the following, only differences from the first embodiment are described, and any matters already described in the first embodiment are not described again.

Configuration

The definition section 22 extracts characteristics information from an image IMG, and based on the extracted characteristics information, defines the image IMG by details, i.e., natural image, text image, or combination of natural image and text image. The definition result is then used as a basis to select any one appropriate tone curve TC from a plurality of those of FIGS. 13A and 13B, for example.

To define the image by details, there are the following manners, for example. That is, information indicating the details of an image previously attached to an image IMG file may be extracted as characteristics information, or edge information (a part of frequency information) may be extracted using an edge extraction filter for use as a basis to determine the image details. Or by the Fourier transform technique or Hadamard transform technique, frequency domain information of the image IMG may be extracted for use as a basis to determine the image details.

In accordance with the tone curve TC selected as above based on the image details, the correction section 23 determines the sizes of the dots D for the tones of the pixels P, and generates printing data defining the size of the dot D for each of the pixels P of the image IMG.

Operation

By referring to the flowchart of FIG. 14, described now is the operation of the printing device PRT of the second embodiment. FIG. 14 is a flowchart of the operation of the printing device of the second embodiment. For the sake of clarity, assumed here is that the pixels of P(1,1), P(1,2), P(1, 3), and others of an incoming image IMG are respectively assigned with tones of 8, 64, 32, and others out of 64 tones from 1 to 64.

Step 20: A user of the printing device PRT uses the input unit 10 for input of an image IMG.

Step S21: When the image IMG is input, the processing section 21 in the processing unit 20 converts the color system of the image IMG, i.e., converts additive colors of RGB to subtractive colors of CMYK as previously known.

Step S22: The processing section 21 also changes the resolution of the image IMG to make it suit to the nozzles N(1) to N(8) of the printing head units PHU(1), PHU(2), PHU(3), and others with any previously-known method.

Step S23: The definition section 22 extracts characteristics information from the CMYK-converted image IMG. For example, image details information being previously attached to the image IMG may be extracted, edge information about the image IMG may be extracted using an edge filter, or an image signal of the image IMG is converted into a frequency domain by the Fourier transform technique, and information about the resulting frequency domain may be extracted.

Step S24: The definition section 22 defines the image by details based on the extracted characteristics information. When the extracted information is image details information, for example, the definition section 22 determines that the image details found in the image details information are the image details of the image IMG, e.g., natural image, text image, or combination of these. When the extracted characteristics information is edge information, for example, the edge information is used for analysis of any edge change or others, and the analysis result is used as a basis to determine the image details, i.e., utilizing the fact that edge changes differently characterize natural images, text images, and others. When the extracted characteristics information is frequency domain information, the image details are determined based on information represented by the corresponding transform coefficient, i.e., utilizing the fact that transform coefficients differently characterize natural images, text images, and others.

Step S25: Based on the determined image details, the definition section 22 selects a tone curve TC from a plurality of those provided in advance for every image details. Assumed here is that two types of tone curves TC are provided for the image details, e.g., tone curve TC of FIG. 13A and that of FIG. 13B. When the image IMG is defined as being a natural image, e.g., photo image, selected is the tone curve TC of FIG. 13A with a relatively small size range for dots. When the image IMG is defined as being a text image, e.g., document image, selected is the tone curve TC of FIG. 13B with a relatively large size range for dots. When the image IMG is defined as being a combination of a natural image and a text image, selected is a tone curve (not shown) with a size range, for dots, being intermediate between the size ranges of FIGS. 13A and 13B.

Step S26: In accordance with the relationship between the tones of the pixels P and the sizes of the dots D, i.e., tone curve, of FIG. 13A or 13B, the correction section 23 specifies the dot D of the size corresponding to "tone 8" of the pixel P(1,1) in the image IMG. Similarly, the correction section 23 sequentially makes such a specification, i.e., the dot D of the size corresponding to the "tone 64" of the pixel P(1,2), the dot D of the size corresponding to the "tone 32" of the pixel P(1,3), and the like.

Step S27: Based on the information about the size of the dot D specified for each of the pixels P in accordance with either the tone curve TC of FIG. 13A or that of FIG. 13B, the printer 41 generates printing data defining the dot sizes D for the tone values of the pixels P. Based on the resulting printing data, the printer 41 prints the image IMG on the medium MED.

Assuming that the image IMG is a natural image, in accordance with the tone curve TC of FIG. 13A, the "tone 8" of the pixel P(1,1) is defined with the dot D of the size corresponding to the "tone 5", the "tone 64" of the pixel P(1,2) is defined with the dot D of the size corresponding to the "tone 32", the "tone 32" of the pixel P(1,3) is defined with the dot D of the size corresponding to the "tone 20", and the like. As a result, generated is printing data defining the size of the dot D for each of the pixels P based on the tone curve TC of FIG. 13A. Therefore, the printer 41 prints the dot D of "size 5", the dot D of "size 32", the dot D of "size 20", and others using the nozzle N(1) of the printing head unit PHU(1), the nozzle (2) of the printing head unit PHU(1), the nozzle N(3) of the printing head unit PHU(1), and the like.

On the other hand, assuming that the image IMG is a document image, in accordance with the tone curve TC of FIG. 13B, the "tone 8" of the pixel P(1,1) is defined with the dot D of the size corresponding to the "tone 14", the "tone 64" of the pixel P(1,2) is defined with the dot D of the size corresponding to the "tone 64" as is originally supposed to be, the "tone 32" of the pixel P(1,3) is defined with the dot D of the size corresponding to the "tone 42", and the like. As a result, generated is printing data defining the size of the dot D for each of the pixels P based on the tone curve TC of FIG. 13B. Therefore, the printer 41 prints the dot D of "size 14", the dot D of "size 64", the dot D of "size 42", and others using the nozzle N(1) of the printing head unit PHU(1), the nozzle (2) of the printing head unit PHU(1), the nozzle N(3) of the printing head unit PHU(1), and the like.

Effects

As described above, with the printing device PRT of the second embodiment, the definition section 22 extracts characteristics information from an image IMG. Based on thus extracted characteristics information, the definition section 22 defines the image IMG by image details, and selects a tone curve TC in accordance with thus determined image details. In this manner, the tone curve TC can be selected to suit with the image details. In accordance with thus selected tone curve TC, the correction section 23 determines the size of the dot D for each of the pixels P of the image IMG, e.g., when the image IMG is a natural image, the tone curve of FIG. 13A is used as a basis. The natural image printed by the printer 41 can thus be of high resolution on the medium MED.

When the image IMG is a text image, the correction section 23 uses the tone curve TC of FIG. 13B as a basis to determine the size of the dot D for each of the pixels P of the image IMG. The text image printed by the printer 41 can thus be high in clarity on the medium MED.

When the image IMG is a combination of a natural image and a text image, based on a tone curve TC being intermediate between the tone curves of FIGS. 13A and 13B, the size of the dot D is determined for each of the pixels P in the image IMG. In the image IMG printed by the printer 41 on the medium MED, the natural image can thus be of high resolution, and the letters and characters can be high in clarity.

In the second embodiment, the input unit 10 corresponds to the image data acquisition unit of the eleventh or forty-first aspects, and the process of extracting characteristics information in the definition section 22 corresponds to the characteristics information extraction unit of the fifteenth or forty-fifth aspects. The process of determining image details in the definition section 22 corresponds to the image type determination unit of the sixteenth or forty-sixth aspects. The process of selecting a tone curve TC in the definition section 22 and the correction section 23, and the process of determining the size of the dot D for each of the pixels P correspond to the dot type selection unit of the eleventh, fourteenth, fifteenth, sixteenth, forty-first, forty-fourth, forty-fifth, and forty-sixth aspects. The process of generating printing data in the correction section 23 corresponds to the printing data generation unit of the eleventh or forty-first aspects, and the printer 41 corresponds to the printing unit of the eleventh aspect.

Third Embodiment

Figure 15:
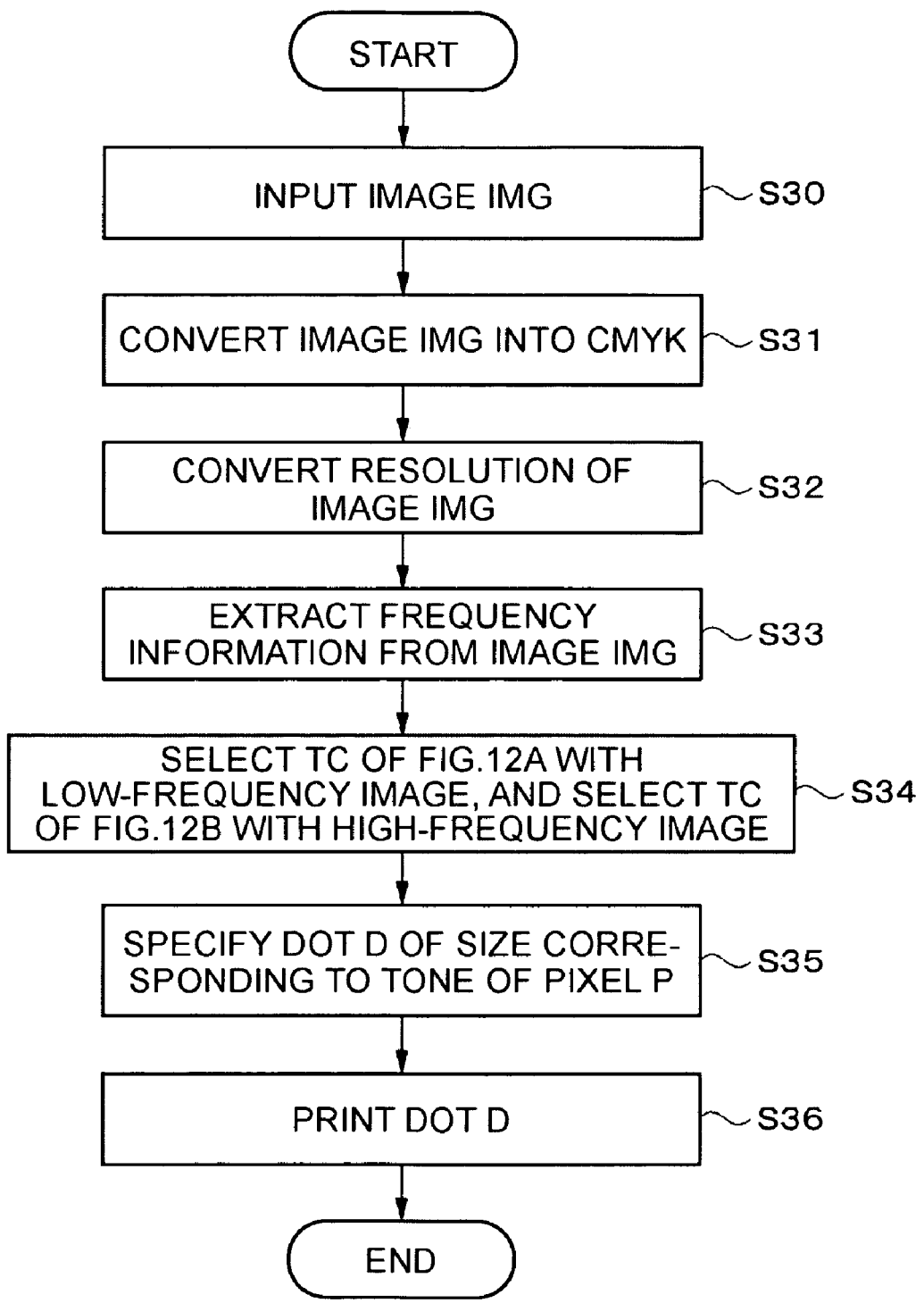
FIG. 15 is a flowchart of the operation of a printing device of a third embodiment.

By referring to the accompanying drawings, described next is a third embodiment of the printing device of the invention. FIG. 15 is a diagram showing a third embodiment of the printing device of the invention.

The configuration of a printing device of this embodiment is similar to that of the first embodiment of FIG. 1, and the configuration of a computer device of this embodiment is similar to that of the first embodiment of FIG. 7. In this embodiment, differences from the first embodiment lie in the definition section 22 of FIG. 1, i.e., frequency information is extracted from an image IMG, and based on the frequency information, a tone curve TC is selected from a plurality of those for use for correction in the correction section 23. In the following, only differences from the first embodiment are described, and any matters already described in the first embodiment are not described again.

Configuration

Figure 12B:
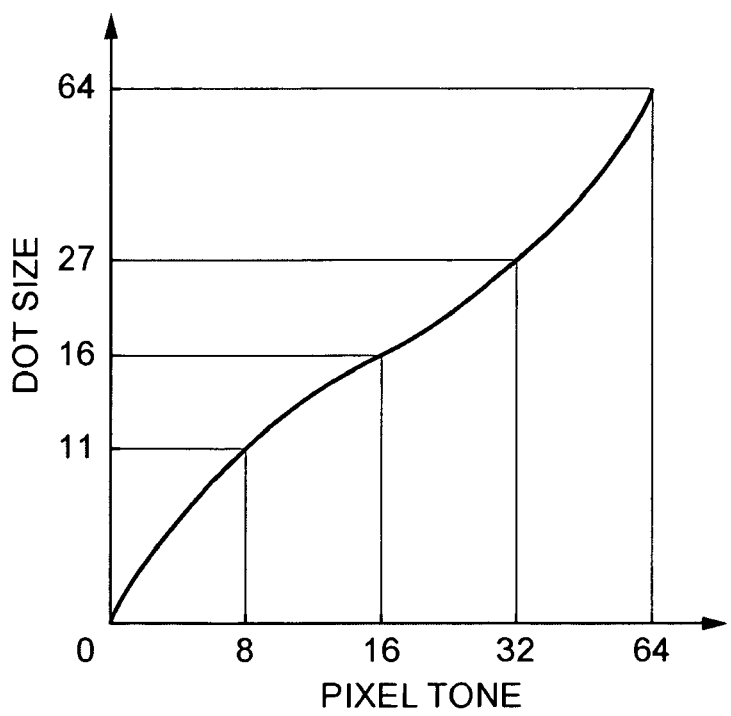
FIG. 12B is a diagram showing an inverted-S-shaped correction tone curve of the modified example 2 of the first embodiment.

The definition section 22 extracts frequency information from an image IMG, and based on thus extracted frequency information, any one appropriate tone curve TC is selected from a plurality of those, e.g., tone curves of FIGS. 12A and 12B.

For selection of a tone curve TC, an LPF (low-pass filter) or others are used to extract information about whether an image signal of the image IMG is of high frequency or not. Based on the extraction result, any one tone curve TC considered appropriate is selected.

In accordance with the tone curve TC selected based on the frequency information as above, the correction section 23 determines the size of the dot D corresponding to the tone of the pixel P, and generates printing data defining the size of the dot D for each of the pixels P of the image IMG.

Operation

By referring to the flowchart of FIG. 15, described now is the operation of the printing device PRT of the third embodiment. FIG. 15 is a flowchart of the operation of the printing device of the third embodiment. For the sake of clarity, assumed here is that the pixels of P(1,1), P(1,2), P(1,3), and others in an incoming image IMG are respectively assigned with tones of 8, 64, 32, and others out of 64 tones from 1 to 64.

Step S30: A user of the printing device PRT uses the input unit 10 for input of an image IMG.

Step S31: When the image IMG is input, the processing section 21 in the processing unit 20 converts the color system of the image IMG, i.e., converts additive colors of RGB to subtractive colors of CMYK as previously known.

Step S32: The processing section 21 also changes the resolution of the image IMG to make it suit to the nozzles N(1) to N(8) of the printing head units PHU(1), PHU(2), PHU(3), and others with any previously-known method.

Step S33: The definition section 22 extracts frequency information from the CMYK-converted image IMG. For example, using an LPF or others with respect to an image signal of the image IMG, extracted is information about whether the image signal is of high frequency or not.

Step S34: Based on the extracted frequency information, the definition section 22 selects a tone curve TC from a plurality of those provided in advance for every frequency range. Assumed here is that two types of tone curves TC are provided for the frequency details, e.g., tone curve TC of FIG. 12A and that of FIG. 12B. When the image IMG is defined as being a low-frequency image, selected is the tone curve TC of FIG. 12A with which the dot D is specified larger than the size for the actual tone in the relatively-low tone range, and the dot D is specified smaller than the size for the tone in the relatively-high tone range. When the image IMG is defined as being a high-frequency image, selected is the tone curve TC of FIG. 12B with which the dot D is specified smaller than the size for the actual tone in the relatively-low tone range, and the dot D is specified larger than the size for the tone in the relatively-high tone range.

Step S35: In accordance with the relationship between the tones of the pixels P and the sizes of the dots D, i.e., tone curve, of FIG. 12A or 12B, the correction section 23 specifies the dot D of the size corresponding to "tone 8" of the pixel P(1,1) in the image IMG. Similarly, the correction section 23 sequentially makes such a specification, i.e., the dot D of the size corresponding to the "tone 64" of the pixel P(1,2), the dot D of the size corresponding to the "tone 32" of the pixel P(1,3), and the like.

Step S36: Based on the information about the size of the dot D specified for each of the pixels P in accordance with either the tone curve TC of FIG. 12A or that of FIG. 12B, the printer 41 generates printing data defining the dot sizes D for the tone values of the pixels P. Based on the resulting printing data, the printer 41 prints the image IMG on the medium MED.

Assuming that the image IMG is a low-frequency image, in accordance with the tone curve TC of FIG. 12A, the "tone 8" of the pixel P(1,1) is defined with the dot D of the size corresponding to the "tone 5", the "tone 64" of the pixel P(1,2) is defined with the dot D of the size corresponding to the "tone 64" as is originally supposed to, the "tone 32" of the pixel P(1,3) is defined with the dot D of the size corresponding to the "tone 38", and the like. As a result, generated is printing data defining the size of the dot D for each of the pixels P based on the tone curve TC of FIG. 12A. Therefore, the printer 41 prints the dot D of "size 5", the dot D of "size 64", the dot D of "size 38", and others using the nozzle N(1)

of the printing head unit PHU(1), the nozzle (2) of the printing head unit PHU(1), the nozzle N(3) of the printing head unit PHU(1), and the like.

On the other hand, assuming that the image IMG is a high-frequency image, in accordance with the tone curve TC of FIG. 12B, the "tone 8" of the pixel P(1,1) is defined with the dot D of the size corresponding to the "tone 11", the "tone 64" of the pixel P(1,2) is defined with the dot D of the size corresponding to the "tone 64" as is originally supposed to be, the "tone 32" of the pixel P(1,3) is defined with the dot D of the size corresponding to the "tone 27", and the like. As a result, generated is printing data defining the size of the dot D for each of the pixels P based on the tone curve TC of FIG. 12B. Therefore, the printer 41 prints the dot D of "size 11", the dot D of "size 64", the dot D of "size 27", and others using the nozzle N(1) of the printing head unit PHU(1), the nozzle (2) of the printing head unit PHU(1), the nozzle N(3) of the printing head unit PHU(1), and the like.

Effects

As described above, with the printing device PRT of the third embodiment, the definition section 22 extracts frequency information from an image IMG. Based on thus extracted frequency information, the definition section 22 determines whether the image IMG is a high- or low-frequency image, and selects a tone curve TC appropriately in accordance with the determination result. Thus selected tone curve TC is used as a basis, when the image IMG is a low-frequency image (blurred image), the correction section 23 determines the size of the dot D for each of the pixels P of the image IMG based on the tone curve TC of FIG. 12A. The low-frequency image printed by the printer 41 can be thus high in contract on the medium MED.

When the image IMG is a high-frequency image, the correction section 23 uses the tone curve TC of FIG. 12B as a basis to determine the size of the dot D for each of the pixels P of the image IMG. The high-frequency image printed by the printer 41 can be thus high in clarity on the medium MED.

In the third embodiment, the input unit 10 corresponds to the image data acquisition unit of the eleventh or forty-first aspects, the process of extracting frequency information in the definition section 22 corresponds to the characteristics information extraction unit of the fifteenth or forty-fifth aspects. The process of selecting a tone curve TC in the definition section 22 and the correction section 23, and the process of determining the size of the dot D for each of the pixels P correspond to the dot type selection unit of the eleventh, fourteenth, fifteenth, sixteenth, eighteenth, nineteenth, twentieth, forty-first, forty-fourth, forty-fifth, forty-sixth, forty-eighth, forty-ninth, and fiftieth aspects. The process of generating printing data in the correction section 23 corresponds to the printing data generation unit of the eleventh or forty-first aspects, and the printer 41 corresponds to the printing unit of the eleventh aspect.

Fourth Embodiment

Figure 16:
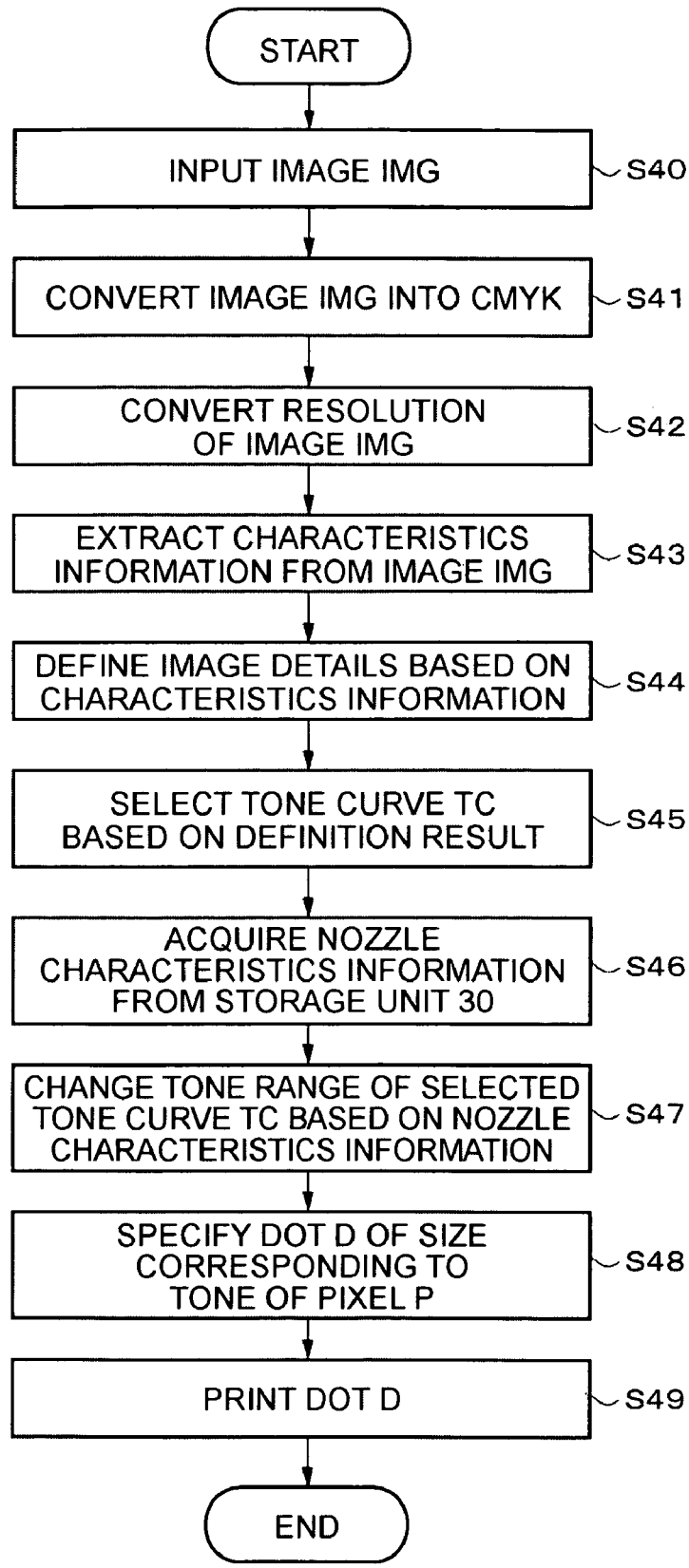
FIG. 16 is a flowchart of the operation of a printing device of a fourth embodiment.

By referring to the accompanying drawings, described next is a fourth embodiment of the printing device of the invention. FIG. 16 is a diagram showing the fourth embodiment of the printing device of the invention.

The configuration of a printing device of this embodiment is similar to that of the second embodiment of FIG. 1, and the configuration of a computer device of this embodiment is similar to that of the second embodiment of FIG. 7. In this embodiment, differences from the second embodiment lie as follows. That is, after the power is on, the scanner 11 of FIG. 1 reads an image of a test pattern printed by the printer 41, i.e., solid image. Based on information about the image read by the scanner 11 as such, a nozzle characteristics information generation section (not shown) of the processing unit 20 analyzes each of the nozzles for their ink discharge condition, e.g., whether density is uniform or not. The analysis result is temporarily stored in the storage unit 30 or others, e.g., until the power is turned off. After the definition section 22 determines the image details, and selects a tone curve TC for the determined image details, the information about the analysis result stored to tell the discharge condition of each of the nozzles (hereinafter, referred to nozzle characteristics information) is acquired. Based on the nozzle characteristics information acquired as such, the tone range of the selected tone curve TC is changed. In the following, only differences from the second embodiment are described, and any matters already described in the second embodiment are not described again.

Configuration

Based on the nozzle characteristics information stored in the storage unit 30, the definition section 22 changes the tone range of a tone curve TC selected in consideration of the image details.

To change the tone range of the tone curve TC, when the nozzles are determined as being more or less suffering from an ink clogging problem due to surroundings change, e.g., temperature or humidity change, the tone range is so changed that the relatively larger-sized dots are to be specified, i.e., avoid the tone range for relatively smaller-sized dots not to cause ink discharge failure.

In accordance with the tone curve TC selected based on such ink characteristics information, the correction section 23 determines the size of the dot D corresponding to the tone of the pixel P, and generates printing data defining the size of the dot D for each of the pixels P of the image IMG.

Operation

By referring to the flowchart of FIG. 16, described now is the operation of the printing device PRT of the fourth embodiment. FIG. 16 is a flowchart of the operation of the printing device of the fourth embodiment. For the sake of clarity, assumed here is that the pixels of P(1,1), P(1,2), P(1,3), and others in an incoming image IMG are respectively assigned with tones of 8, 64, 32, and others out of 64 tones from 1 to 64.

Step S40: A user of the printing device PRT uses the input unit 10 for input of an image IMG.

Step S41: When the image IMG is input, the processing section 21 of the processing unit 20 converts the color system of the image IMG, i.e., converts additive colors of RGB to subtractive colors of CMYK as previously known.

Step S42: The processing section 21 also changes the resolution of the image IMG to make it suit to the nozzles N(1) to N(8) of the printing head units PHU(1), PHU(2), PHU(3), and others with any previously-known method.

Step S43: The definition section 22 extracts characteristics information from the CMYK-converted image IMG. For example, the definition section 22 extracts image detail information previously attached to the image IMG, edge information of the image IMG using an edge filter, or converts an image signal of the image IMG into a frequency domain by the Fourier transform technique, and extract information about the resulting frequency domain.

Step S44: The definition section 22 determines the image details based on the extracted characteristics information. When the extracted information is image details information, for example, the definition section 22 determines that the image details found in the image details information are the image details of the image IMG, e.g., natural image, text image, or combination of these. When the extracted characteristics information is edge information, for example, the edge information is used for analysis of any edge change or others, and the analysis result is used as a basis to determine the image details, i.e., utilizing the fact that edge changes differently characterize natural images, text images, and others. When the extracted characteristics information is frequency domain information, the image details are determined based on information represented by the corresponding transform coefficient, i.e., utilizing the fact that transform coefficients differently characterize natural images, text images, and others.

Step S45: Based on the determined image details, the definition section 22 selects a tone curve TC from a plurality of those provided in advance for every image details. Assumed here is that two types of tone curves TC are provided for the image details, e.g., tone curve TC of FIG. 13A and that of FIG. 13B. When the image IMG is defined as being a natural image, e.g., photo image, selected is the tone curve TC of FIG. 13A with a relatively small size range for dots. When the image IMG is defined as being a text image, e.g., document image, selected is the tone curve TC of FIG. 13B with a relatively large size range for dots. When the image IMG is defined as being a combination of a natural image and a text image, selected is a tone curve (not shown) with a size range, for dots, being intermediate between the size ranges of FIGS. 13A and 13B.

Step S46: The definition section 22 acquires nozzle characteristics information from the storage unit 30.

Here, the nozzle characteristics information includes information about whether the dots formed by the nozzles are uniform in density or not, and when the ink is not sufficiently discharged from the nozzles, information about an average ink deficit with respect to the ink amount that is supposed to be discharged from the nozzles.

Figure 17A:
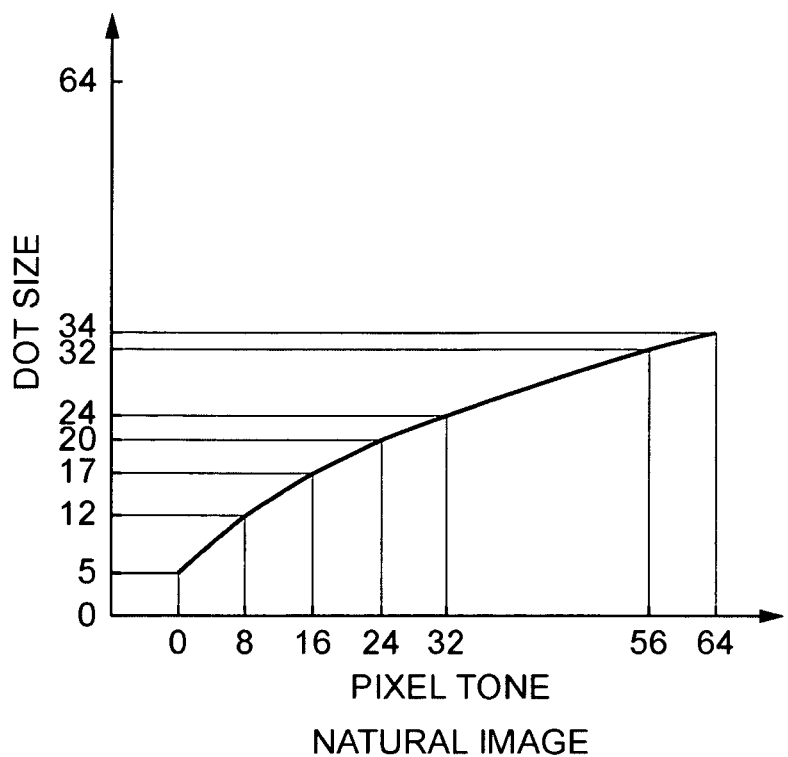
FIG. 17A is a diagram showing the relationship between a tone-range-changed natural image and the dot sizes.
Figure 17B:
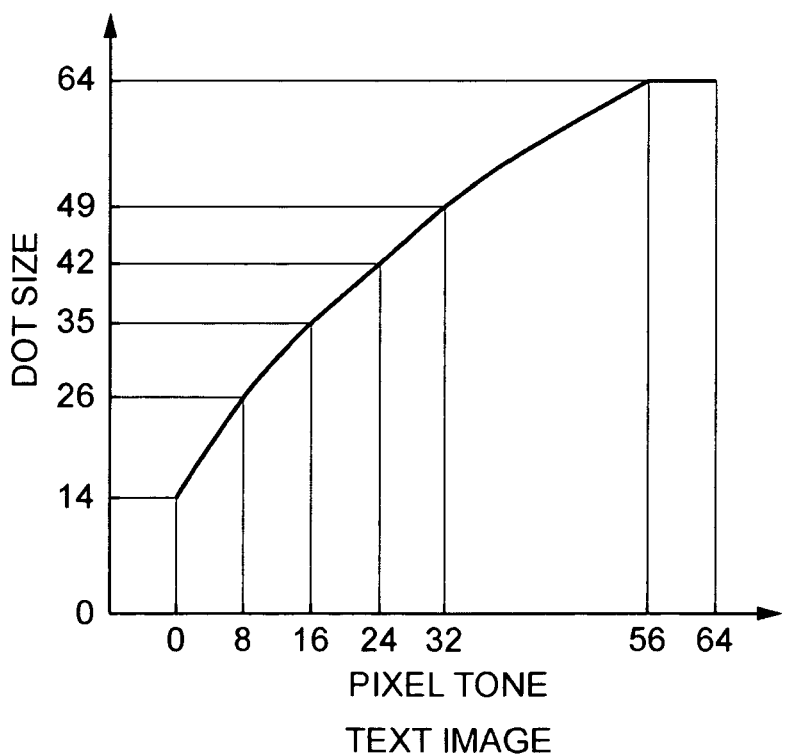
FIG. 17B is a diagram showing the relationship between a tone-range-changed text image and the dot sizes.

Step S47: Based on the acquired nozzle characteristics information, when the average value of the ink discharge amount from the nozzles is normal, the definition section 22 leaves as it is the tone range of the tone curve TC selected in step S45. On the other hand, when the ink discharge amount is not enough, the definition section 22 changes the tone range of the tone curve TC selected in step S45. To be specific, with not enough ink discharge amount as above, i.e., the nozzles are more or less suffering from an ink clogging problem, the definition section 22 changes the tone range to preclude the possibility of forming relatively small-sized dots. For example, when the selected tone curve TC is of FIG. 13A, as shown in FIG. 17A, the definition section 22 changes the tone range to preclude the possibility of forming dots D of sizes corresponding to the tones 0 to 7 of the pixels, i.e., dots D corresponding to the dot sizes of 0 to 4. On the other hand, when the selected tone curve TC is of FIG. 13B, as shown in FIG. 17B, the definition section 22 changes the tone range to preclude the possibility of forming dots D of sizes corresponding to the tones 0 to 7 of the pixels, i.e., dots D corresponding to the dot sizes of 0 to 13.

Step S48: In accordance with the relationship between the tones of the pixels P and the sizes of the dots D, i.e., tone curve, of FIG. 13A, 13B, 17A, or 17B after the tone range change process, the correction section 23 specifies the dot D of the size corresponding to the "tone 8" of the pixel P(1,1) in the image IMG. Similarly, the correction section 23 sequentially makes such a specification, i.e., the dot D of the size corresponding to the "tone 64" of the pixel P(1,2), the dot D of the size corresponding to the "tone 32" of the pixel P(1,3), and the like.

Step S49: Based on the information about the size of the dot D specified for each of the pixels P in accordance with any one of the tone curve TC of FIGS. 13A, 13B, 17A, and 17B, the printer 41 generates printing data defining the sizes of the dots D for the tone values of the pixels P. Based on the resulting printing data, the printer 41 prints the image IMG on the medium MED.

Assuming that the image IMG is a natural image and the tone range is changed, in accordance with the tone curve TC of FIG. 17A, the "tone 8" of the pixel P(1,1) is defined with the dot D of the size corresponding to the "tone 12", the "tone 64" of the pixel P(1,2) is defined with the dot D of the size corresponding to the "tone 34", the "tone 32" of the pixel P(1,3) is defined with the dot D of the size corresponding to the "tone 24", and the like. As a result, generated is printing data defining the size of the dot D for each of the pixels P based on the tone curve TC of FIG. 17A. Therefore, the printer 41 prints the dot D of "size 12", the dot D of "size 34", the dot D of "size 24", and others using the nozzle N(1) of the printing head unit PHU(1), the nozzle N(2) of the printing head unit PHU(1), the nozzle N(3) of the printing head unit PHU(1), and the like.

On the other hand, assuming that the image IMG is a document image and the tone range is changed, in accordance with the tone curve TC of FIG. 17B, the "tone 8" of the pixel P(1,1) is defined with the dot D of the size corresponding to the "tone 26", the "tone 64" of the pixel P(1,2) is defined with the dot D of the size corresponding to the "tone 64" as is originally supposed to be, the "tone 32" of the pixel P(1,3) is defined with the dot D of the size corresponding to the "tone 49", and the like. As a result, generated is printing data defining the size of the dot D for each of the pixels P based on the tone curve TC of FIG. 17B. Therefore, the printer 41 prints the dot D of "size 26", the dot D of "size 64", the dot D of "size 49", and others using the nozzle N(1) of the printing head unit PHU(1), the nozzle N(2) of the printing head unit PHU(1), the nozzle N(3) of the printing head unit PHU(1), and the like.

Effects

As described above, with the printing device PRT of the fourth embodiment, the definition section 22 changes the tone range of any selected tone curve TC whenever required based on the nozzle characteristics information. In accordance with the tone curve through with the change selection process as such, when the image IMG is a natural image, and when the ink is not sufficiently discharged from the nozzles, the correction section 23 determines the size of the dot D for each of the pixels P of the image IMG based on the tone curve TC of FIG. 17A. When the image IMG is a text image, and when the ink is not sufficiently discharged from the nozzles, the correction section 23 determines the size of the dot D for each of the pixels P of the image IMG based on the tone curve TC of FIG. 17B. In this manner, it is possible to preclude the possibility of causing the tones of the dots D to be printed on the medium MED to look considerably different from the input image IMG due to the ink droplet discharge failure.

In the fourth embodiment, the input unit 10 corresponds to the image data acquisition unit of the eleventh or forty-first aspects. The process of acquiring nozzle characteristics information in the scanner 11 corresponds to the print element property information acquisition unit in the seventeenth or forty-seventh aspect, and the process of extracting characteristics information in the definition section 22 corresponds to the characteristics information extraction unit of the fifteenth or forty-fifth aspect. The process of determining image details of the definition section 22 corresponds to the image type determination unit of the sixteenth of forty-sixth aspect. The process of selecting a tone curve TC in the definition section 22 and the correction section 23, the process of changing the tone range of the selected tone curve TC, and the process of determining the size of the dot D for each of the pixels P are corresponding to the dot type selection unit of the eleventh, fourteenth, fifteenth, sixteenth, forty-first, forty-fourth, forty-fifth, and forty-sixth aspects. The process of generating printing data in the correction section 23 corresponds to the printing data generation unit of the eleventh or forty-first aspects, and the printer 41 corresponds to the printing unit of the eleventh aspect.

Figures 18A, 18B, 18C:
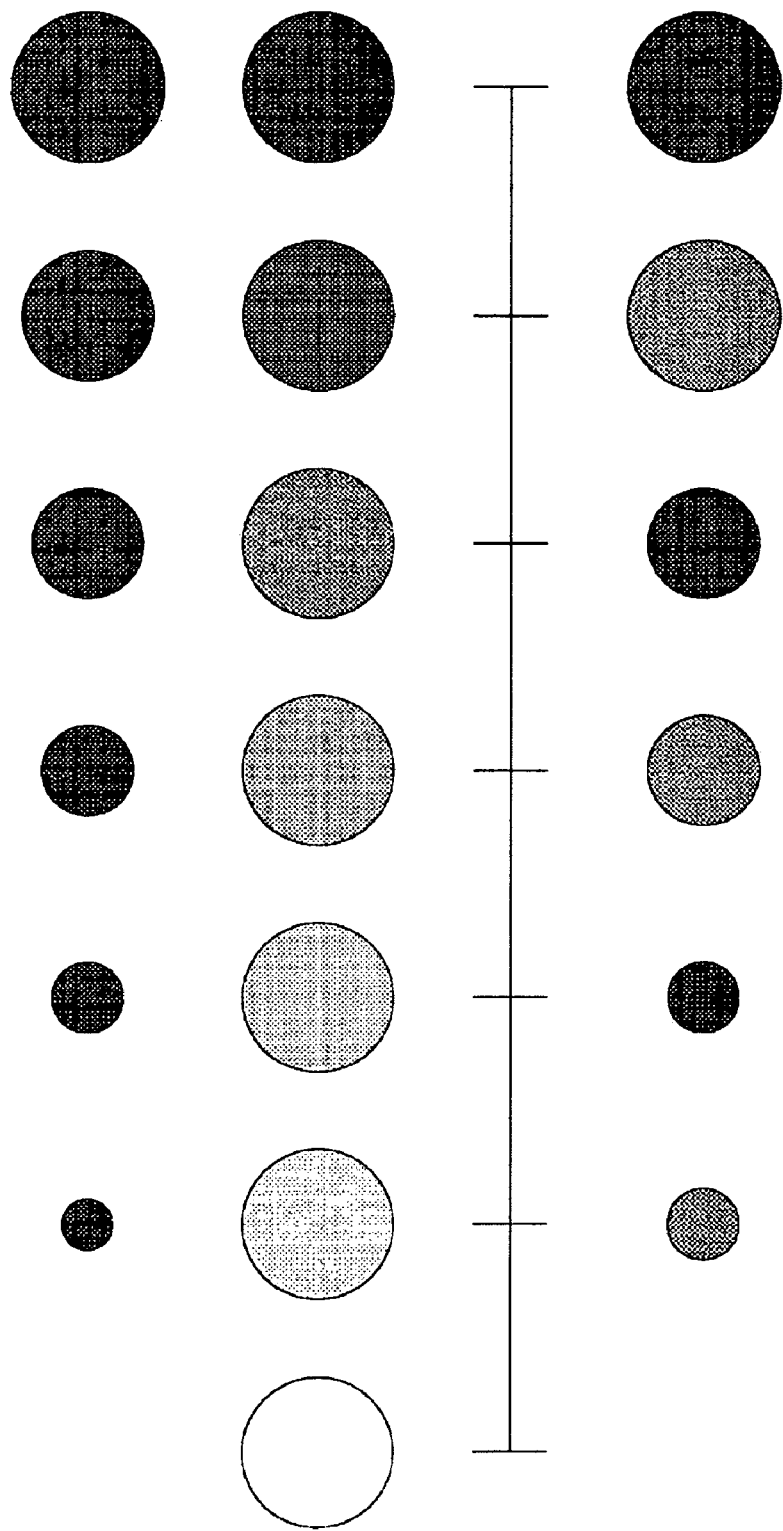
FIGS. 18A to 18C are each a diagram showing a dot type variation.

In the above first to fourth embodiments, the printer 41 of FIG. 1 is of a so-called inkjet type, printing an image IMG on a medium MED by discharging ink droplets from nozzles. As shown in FIG. 18A, by changing the sizes of forming dots for each of various inks, the resulting dots are to correspond to the tones of the colors of ink. This is surely not restrictive, and the printer 41 may be of sublimation type for printing. With this being the case, as shown in FIG. 18B, the dot size is fixed but the dot density is varied so that the resulting dots are to correspond to the tones of the colors of ink. In this case, the "dot size", i.e., vertical axis of the graph of FIGS. 6, 11, 12A, 12B, 13A, 13B, 17A, and 17B will be "dot density (tone)". Alternatively, with the printer 41 of inkjet type, the colors of ink may be of the same base-colors but of different densities, and as shown in FIG. 18C, dots are to be formed with various dot sizes and densities to make the resulting dots to suit to the tones. Here, the colors of ink are exemplified by magenta and light magenta, cyan and light cyan, or various types of gray ink of different densities. With such a configuration, the tone range can be increased for representation depending on the combination between the dot sizes and the densities.

In the above first to fourth embodiments, the printing device PRT includes the input unit 10, the processing unit 20, and the storage unit 30. The printing device PRT has the functions of selecting any appropriate tone curve for an image IMG acquired via the input unit 10, determining the size of dot D for a tone value of the corresponding pixel P in the image IMG, and generating printing data based on the determination result. This is surely not the only configuration, and the printer 41 may be separated from the printing devices PRT of the first to fourth embodiments, and the remaining functions can be implemented only by any general-purpose information processor (corresponds to the printing data generation device) such as personal computer.

What is claimed is:

1. A printing method, comprising the step of:
    printing an image of a plurality of pixels by discharging a plurality of size-varying ink droplets each representing a tone of the corresponding pixe; and
    correcting any of the tones in accordance with a tone curve that serves as a criterion for a tone correction and defines a tone relationship in terms of before and after the tone correction;
    wherein in the printing step, the image is printed with the tone corrected in the correcting step using any of the droplets of a size corresponding to the corrected tone.

2. The printing method according to claim 1, further comprising at least one of the steps of:
    defining at least one of an upper and a lower limit in the tone curve for the corrected tone, and
    defining a distance between any adjacent pixels after the tone correction in accordance with a possible printing problem to be caused by at least one of printing of the image, details of the printing, and status of surroundings of a printing device.

3. A printing device comprising:
    a printing section that prints an image of a plurality of pixels by discharging a plurality of size-varying ink droplets each representing a tone of the corresponding pixel; and
    a correction section that corrects any of the tones in accordance with a tone curve that serves as a criterion for a tone correction and defines a tone relationship in terms of before and after the tone correction;
    wherein the printing section prints the image with the tone corrected in the correction section using any of the droplets of a size corresponding to the corrected tone.

4. The printing device according to claim 3, further comprising a definition section that defines at least one of:
    at least one of an upper and a lower limit in the tone curve for the corrected tone, and
    a distance between any adjacent pixels after the tone correction in accordance with a possible printing problem to be caused by at least one of printing of the image, details of the printing, and surroundings of the printing device.

5. A printing device, comprising:
    a printing head including a printing element that is capable of forming a plurality types of dots each corresponding to each of M tones (M≧3) represented by each pixel of an image;
    an image data acquisition unit that acquires image data of pixel values each representing each of the tones of the pixels of the image;
    a dot selection unit that selects from the type-varying dots, for each of the pixel values of the acquired image data, a dot corresponding to each of the tones represented by the pixel values;
    a printing data generation unit that generates, based on the selection result derived for each of the pixel values, printing data in which each of the pixel values is defined by the dot;
    a printing unit that prints, based on the printing data, an image of the image data using the printing head;
    a characteristics information extraction unit that extracts characteristics information from the acquired image data;
    an image type determination unit that determines an image of the acquired image data based on the extracted characteristics information;
    wherein based on the extracted characteristics information, the dot selection unit selects, for any of the pixel values of the acquired image data showing predetermined details of the characteristic information, any of the dots corresponding to any of the tones different from the tone of the pixel value; and
    wherein based on the determined image, for any of the dots corresponding to each of the M tones, the dot selection unit determines a tone range for use for a selection process.

6. The printing device according to claim 5, wherein the varying dots are of different sizes corresponding to each of the M tones.

7. The printing device according to claim 5, wherein
    the varying dots are of the same sizes but of different printing densities corresponding to each of the M tones.

8. The printing device according to claim 5, wherein
    the dot selection unit selects, for any of the pixel values of a predetermined value, any of the dots corresponding to any of the tones different from the tone represented by the pixel value.

9. The printing device according to claim 8, wherein
    when the pixel values are density values,
    for the pixel value of the predetermined value being smaller than a predetermined pixel value, the dot selection unit selects any of the dots corresponding to any of the tones represented by any of the pixel values smaller than the pixel value, and for the pixel value of the predetermined value being larger than the predetermined pixel value, the dot selection unit selects any of the dots corresponding to any of the tones represented by any of the pixel values larger than the pixel value.

10. The printing device according to claim 8, wherein when the pixel values are density values, for the pixel value of the predetermined value being smaller than a predetermined pixel value, the dot selection unit selects any of the dots corresponding to any of the tones represented by any of the pixel values larger than the pixel value, and for the pixel value of the predetermined value being larger than the predetermined pixel value, the dot selection unit selects any of the dots corresponding to any of the tones represented by any of the pixel values smaller than the pixel value.

11. The printing device according to claim 5, comprising a print element property information acquisition unit that acquires print element property information representing properties of a print element configuring the printing head, wherein based on the acquired print element property information, for any of the dots corresponding to each of the M tones, the dot selection unit determines a tone range for use for a selection process.

12. The printing device according to claim 5, wherein the characteristics information includes frequency information, and when the pixel values are density values, for any of the pixel values with a frequency being a predetermined frequency or lower in the characteristics information extracted from the acquired image data, when the pixel value of the predetermined value is smaller than a predetermined pixel value, the dot selection unit selects any of the dots corresponding to any of the tones represented by any of the pixel values smaller than the pixel value, and when the pixel value of the predetermined value is larger than the predetermined pixel value, the dot selection unit selects any of the dots corresponding to any of the tones represented by any of the pixel values larger than the pixel value.

\* \* \* \* \*